(12) United States Patent
Nakamura et al.

(10) Patent No.: US 6,949,138 B2
(45) Date of Patent: Sep. 27, 2005

(54) PIGMENT DISPERSION LIQUID, MANUFACTURING PROCESS THEREOF, PIGMENT INK FOR INK JETTING, AND INK JET IMAGE RECORDING METHOD EMPLOYING THE SAME

(75) Inventors: Masaki Nakamura, Hino (JP); Satoshi Ito, Hino (JP); Hideki Hoshino, Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/998,764

(22) Filed: Nov. 29, 2001

(65) Prior Publication Data

US 2002/0112644 A1 Aug. 22, 2002

(30) Foreign Application Priority Data

Dec. 12, 2000 (JP) ........................................ 2000-377068
Aug. 2, 2001 (JP) ........................................ 2001-234966

(51) Int. Cl.$^7$ .............................................. C04B 14/00
(52) U.S. Cl. ..................... 106/401; 106/31.75; 106/499
(58) Field of Search ............................. 106/31.75, 401, 106/499

(56) References Cited

U.S. PATENT DOCUMENTS

| | | | | |
|---|---|---|---|---|
| 5,324,349 A | * | 6/1994 | Sano et al. ............... | 106/31.25 |
| 5,985,017 A | * | 11/1999 | Bugner et al. ............ | 106/31.75 |
| 6,132,501 A | * | 10/2000 | Scaringe et al. .......... | 106/31.75 |
| 6,235,099 B1 | * | 5/2001 | Aida et al. ................ | 106/31.65 |

FOREIGN PATENT DOCUMENTS

| | | | |
|---|---|---|---|
| EP | 0 776 952 | 6/1997 | |
| EP | 0776952 | * 6/1997 | ........... C09D/11/00 |
| JP | 2002-322404 | * 8/2002 | |
| WO | WO 00/52102 | 9/2000 | |
| WO | WO 03/093373 | * 11/2003 | |

* cited by examiner

*Primary Examiner*—J. A. Lorengo
*Assistant Examiner*—S. S. Manlove
(74) *Attorney, Agent, or Firm*—Squire, Sanders & Dempsey L.L.P.

(57) ABSTRACT

A pigment dispersion liquid comprises pigment particles dispersed in a dispersion medium, the difference ($D_{90}-D_{10}$) between $D_{90}$ and $D_{10}$ being not more than 25 nm, wherein $D_{90}$ and $D_{10}$ represent the primary particle size that the pigment particles having a primary particle size up to and including $D_{90}$ account for 90% by number of the total pigment particles, and the particle size that the pigment particles having a primary particle size up to and including $D_{10}$ account for 10% by number of the total pigment particles, respectively, in the integral of the primary particle size distribution function $dG=f(D)dD$ of the pigment particles in which G is a particle number (%) and D is a primary particle size (nm).

10 Claims, 2 Drawing Sheets

PIGMENT DISPERSION LIQUID, MANUFACTURING PROCESS THEREOF, PIGMENT INK FOR INK JETTING, AND INK JET IMAGE RECORDING METHOD EMPLOYING THE SAME

FIELD OF THE INVENTION

The present invention relates to a pigment dispersion liquid, a manufacturing method thereof, a pigment ink for ink jetting used in an ink jet recording, and an ink jet image recording method employing the pigment ink.

BACKGROUND OF THE INVENTION

Ink jet recording is carried out in such a manner that minute ink droplets are allowed to jet utilizing various working principles, and to adhere onto a recording medium so that images and texts are recorded. Ink jet recording exhibits advantages of relatively high speed, low noise and the ease of multicolor formation.

Further, as a result of technical progress in recent years, the image quality of ink jet prints prepared by utilizing a dye ink have approached those prepared utilizing silver halide photography, and further, the price of such units has been reduced. As a result, ink jet printing has been increasingly employed.

Generally, dyes are soluble in solvents, and dye molecules are subjected to dying in either a molecular state or a cluster state. Accordingly, each dye molecule exists in a similar environment. Thus its absorption spectra have a narrow band and the resultant color is very pure as well as clear. In addition, since dyes do not exhibit particle patterns, light scattering nor light reflection, the dye ink can provide an ink jet image with high transparency as well as clear hue.

However, when dye molecules are decomposed due to photochemical reactions and the like, the number of dye molecules decreases. Since the color density is proportional to the number of dye molecules, a decrease in the number of dye molecules results in degradation of light fastness Ink jet recorded images utilizing a dye ink provide high image quality, but the image quality markedly degrades during storage. Accordingly, the present situation is such that, in terms of image quality stability, no ink jet technique has yet developed which exceeds silver halide photography in that regard.

While competing with dye ink, there is pigment ink in which pigments with good light fastness is employed as the colorant, as ink to be used to prepare images with desired light fastness. Pigment is easy to form particles as compared to dyes, and scatters light, resulting in images without transparency. Accordingly, pigment has the defect in that it is inferior in color reproduction to dyes.

In order to overcome such a defect, an attempt has been made to improve color reproduction by employing ink containing pigment particles with a small particle size, the pigment particles being obtained by dispersion processing. However, as primary pigment particles are made smaller, they become more difficult to be dispersed in a dispersion medium, which results in the problem in that viscosity of the resulting dispersion liquid increases. As a technique to solve such a problem, a technique is known in the art, which modifies the surface of the pigment particles with pigment derivatives or inorganic salts. Typically, there is a technique in which pigment particles are milled in a mill at high temperature for a long time or a technique in which pigment particles are dissolved in sulfuric acid and poured into water to form paste. Regarding quinacridone pigment, there is the proposal as disclosed in Japanese Patent Publication No. 54-135821 and in Japanese Patent O.P.I. Publication Nos. 5-230384, in which quinacridone is dissolved in DMSO together with pigment derivatives to form paste.

However, these techniques are those for preparing a dispersion liquid having a high content of polymers in an aqueous or non-aqueous dispersion medium such as a coating. They could not be applied to ink for ink jet recording to be required to have a low viscosity and an extremely low content of polymers. Their application to ink for ink jet recording necessitated an increased content of polymeric dispersants in the ink, which resulted in a problem in that jetting stability was deteriorated due to an increase in the ink viscosity, and therefore, they could not solve the fundamental problem as described above.

SUMMARY OF THE INVENTION

Accordingly, an object of the invention is to provide a pigment dispersion liquid having pigment particles with a small primary particle size and a manufacturing process thereof. Another object of the invention is to provide a pigment ink for ink jet recording (hereinafter referred to also as a pigment ink) with improved ink stability and minimized ink head nozzle clogging, giving a recording image with excellent transparency, improved glossiness, and minimized bronzing, and to provide an ink jet recording method employing such pigment ink.

DETAILED DESCRIPTION OF THE INVENTION

Figure 1:
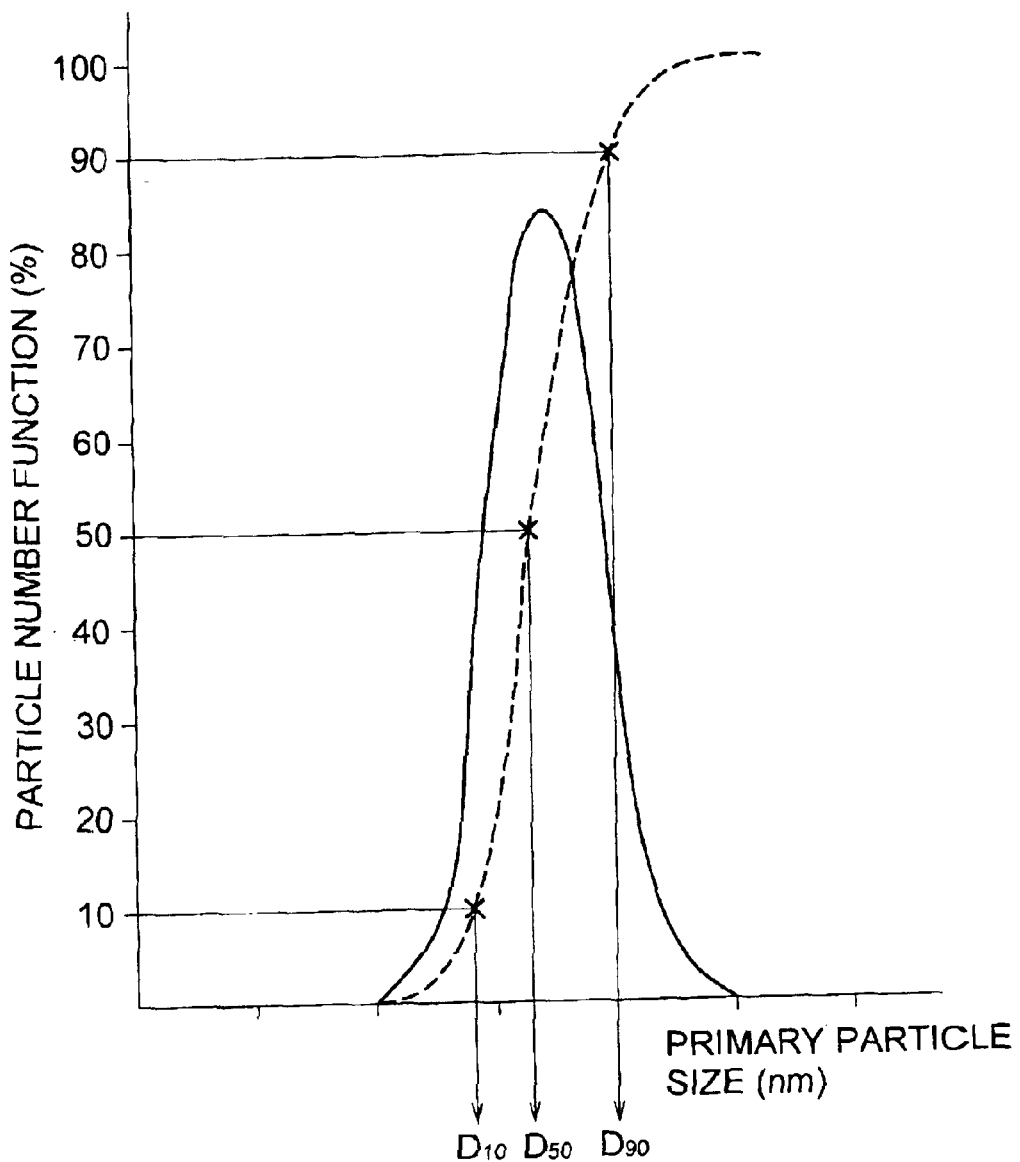
FIG. 1 shows a primary particle size distribution curve of the pigment particle dispersion liquid.

The present invention has been attained by the following constitutions:

1. A pigment dispersion liquid comprising pigment particles dispersed in a dispersion medium, the difference ($D_{90}-D_{10}$) between $D_{90}$ and $D_{10}$ being not more than 25 nm, wherein $D_{90}$ and $D_{10}$ represent the primary particle size that the pigment particles having a primary particle size up to and including $D_{90}$ account for 90% by number of the total pigment particles, and the particle size that the pigment particles having a primary particle size up to and including $D_{10}$ account for 10% by number of the total pigment particles, respectively, in the integral of the primary particle size distribution function $dG=f(D)dD$ of the pigment particles in which G is a particle number (%) and D is a primary particle size (nm).

2. The pigment dispersion liquid of item 1 above, wherein the average primary particle size of the pigment particles is not more than 30 nm.

3. The pigment dispersion liquid of item 1 above, further comprising a water soluble polymer or a surfactant.

4. The pigment dispersion liquid of item 1 above, wherein a water soluble polymer is adsorbed on the surface of the pigment particles.

5. The pigment dispersion liquid of item 4 above, wherein the water soluble polymer has an anionic polar group.

6. The pigment dispersion liquid of item 1 above, wherein a surfactant is adsorbed on the surface of the pigment particles.

7. The pigment dispersion liquid of item 1 above, wherein the pigment dispersion liquid comprises a pigment derivative having a polar group.

8. The pigment dispersion liquid of item 1 above, wherein the dispersion medium is an aqueous medium containing water in an amount of at least 50% by weight.

9. A pigment dispersion liquid comprising pigment particles dispersed in a dispersion medium, the polydispersity index (PDI) of the pigment particles represented by formula (1) being not more than 2, $$PDI=(D_{90}-D_{10})/D_{50} \quad \text{formula (1)}$$

wherein $D_{90}$, $D_{50}$, and $D_{10}$ represent the primary particle size that the pigment particles having a primary particle size up to and including $D_{90}$ account for 90% by number of the total pigment particles, the primary particle size that the pigment particles having a primary particle size up to and including $D_{50}$ account for 50% by number of the total pigment particles, and the particle size that the pigment particles having a primary particle size up to and including $D_{10}$ account for 10% by number of the total pigment particles, respectively, in the integral of the primary particle size distribution function $dG=f(D)dD$ of the pigment particles in which G is a particle number (%) and D is a primary particle size (nm).

10. The pigment dispersion liquid of item 9 above, further comprising a water soluble polymer or a surfactant.

11. The pigment dispersion liquid of item 9 above, wherein a water soluble polymer is adsorbed on the surface of the pigment particles.

12. The pigment dispersion liquid of item 11 above, wherein the water soluble polymer has an anionic polar group.

13. The pigment dispersion liquid of item 9 above, wherein a surfactant is adsorbed on the surface of the pigment particles.

14. The pigment dispersion liquid of item 9 above, wherein the pigment dispersion liquid comprises a pigment derivative having a polar group.

15. The pigment dispersion liquid of item 9 above, wherein the dispersion medium is an aqueous medium containing water in an amount of at least 50% by weight.

16. A process for manufacturing a pigment dispersion liquid, wherein the process comprises the step of mixing a solution containing pigment and a polymer with a liquid medium in which the pigment are insoluble to precipitate pigment particles.

17. The process of item 16 above, wherein the polymer is water soluble, and at least 50% by weight of the liquid medium is water.

18. The process of item 16 above, wherein desalting is carried out at the same time as the precipitation of the pigment particles.

19. A process for manufacturing a pigment dispersion liquid, wherein the process comprises the step of mixing a solution containing pigment with a liquid medium containing a polymer, the pigment being insoluble in the liquid medium, to precipitate pigment particles.

20. The process of item 19 above, wherein the polymer is water soluble, and at least 50% by weight of the liquid medium is water.

21. The process of item 20 above, wherein desalting is carried out at the same time as the precipitation of the pigment particles.

22. A process for manufacturing a pigment dispersion liquid, wherein the process comprises the step of mixing a solution containing pigment and a surfactant with a liquid medium in which the pigment is insoluble to precipitate pigment particles.

23. A pigment ink for ink jetting comprising the pigment dispersion liquid of claim 1 or the pigment dispersion liquid manufactured according to the process of claim 16.

24. A pigment ink for ink jetting comprising the pigment dispersion liquid of item 1 above or the pigment dispersion liquid manufactured according to the process of item 16 above.

25. An ink jet image recording method, wherein the method comprises the step of jetting the pigment ink for ink jetting of item 23 above on a porous ink jet recording sheet to form an image.

26. The ink jet image recording method of item 25 above, wherein the average primary particle size of the pigment particles contained in the pigment ink is not more than 80% of an average void size of the porous ink jet recording sheet.

27. An ink jet image recording method, wherein the method comprises the step of jetting the pigment ink for ink jetting of item 24 above on a porous ink jet recording sheet to form an image.

28. The ink jet image recording method of item 27 above, wherein the average primary particle size of the pigment particles contained in the pigment ink is not more than 80% of an average void size of the porous ink jet recording sheet.

29. A process for manufacturing a pigment dispersion liquid, wherein the method comprises the step of adding a pigment solution to an aqueous pigment solution in which a pigment derivative having an anionic group is dissolved in an aqueous medium or an aqueous pigment dispersion liquid in which a pigment derivative having an anionic group is dispersed in an aqueous medium.

30. The process of item 29 above, wherein the pigment derivative has the same nucleus as the pigment.

31. The process of item 29 above, wherein the pigment derivative and the pigment each have a quinacridone nucleus, and the pigment solution is a solution in which the pigment is dissolved in an alkali aprotic polar solvent.

32. The process of item 29 above, wherein the anionic group is a sulfonic acid group or its salt group.

33. A pigment ink manufactured from the pigment dispersion liquid manufactured according to the process of item 29 above.

101. a pigment dispersion liquid comprising pigment particles dispersed in a dispersion medium, the difference between $D_{90}$ and $D_{10}$ in the primary particle size distribution of the pigment particles being not more than 25 nm, wherein $D_{90}$ and $D_{10}$ represent a particle size that the integral of a distribution function $dG=F(D)dD$ of the pigment particles reaches 0.9 (90% by number) of the total particles and a particle size that the integral of a distribution function $dG=F(D)dD$ of the pigment particles reaches 0.1 (10% by number) of the total particles, respectively.

102. the pigment dispersion liquid of item 101 above, wherein the average primary particle size of the pigment particles is not more than 30 nm.

103. a pigment dispersion liquid comprising pigment particles dispersed in a dispersion medium, the polydispersity index (PDI) of the pigment particles represented by formula (1) being not more than 2, formula (1)

$$PDI=(D_{90}-D_{10})/D_{50}$$

$D_{90}$, $D_{50}$ and $D_{10}$ represent a particle size that the integral of a distribution function $dG=F(D)dD$ of the pigment particles reaches 0.9 (90% by number) of the total particles, a particle size that the integral reaches 0.5 (50% by number) of the total particles, and a particle size that the integral reaches 0.1 (10% by number) of the total particles, respectively.

104. the pigment dispersion liquid of any one of items 101 through 103 above, wherein a water soluble polymer is adsorbed on the surface of the pigment particles.

105. the pigment dispersion liquid of item 104 above, wherein the water soluble polymer has a polar group.

106. the pigment dispersion liquid of any one of items 101 through 105 above, wherein the pigment dispersion liquid comprises a pigment derivative having a polar group.

107. the pigment dispersion liquid of any one of items 101 through 103 above, wherein the pigment particles are dispersed a liquid dispersion medium.

108. the pigment dispersion liquid of item 107, wherein the liquid dispersion medium is an aqueous medium containing water in an amount of at least 50% by weight.

109. a process for manufacturing a pigment dispersion liquid, wherein the process comprises the step of mixing a solution containing pigment particles and a polymer with a liquid medium in which the pigment particles are insoluble.

110. a process for manufacturing a pigment dispersion liquid, wherein the process comprises the step of mixing a solution containing pigment particles with a liquid medium containing a polymer, the pigment particles being insoluble in the liquid medium.

111. the process for manufacturing a pigment dispersion liquid of item 109 or 110 above, wherein the liquid medium is an aqueous medium containing water in an amount of at least 50% by weight, and the polymer is water soluble.

112. the process for manufacturing a pigment dispersion liquid of any one of items 109 through 111 above, wherein precipitation and desalting are simultaneously carried out.

113. a pigment ink for ink jetting comprising the pigment dispersion liquid of any one of items 101 through 108 or the pigment dispersion liquid manufactured in any one of items 109 through 112.

114. an ink jet image recording method, wherein the method comprises the step of jetting the pigment ink of item 113 for ink jetting on a porous ink jet recording sheet to form an image.

115. the ink jet image recording method of item 114 above, wherein the average primary particle size of the pigment particles contained in the pigment ink is not more than 80% of an average void size of the porous ink jet recording sheet.

201 a process for manufacturing a pigment dispersion liquid, wherein the method comprises the step of adding a pigment solution to an aqueous solution in which a pigment derivative having an anionic group is dissolved in an aqueous medium or an aqueous dispersion liquid in which a pigment derivative having an anionic group is dispersed in an aqueous medium.

202 the process for manufacturing a pigment dispersion liquid of item 201 above, wherein the pigment derivative having an anionic group has the same nucleus as the pigment dissolved in the pigment solution.

203 the process for manufacturing a pigment dispersion liquid of item 201 above, wherein each of the pigment derivative having an anionic group and the pigment dissolved in the pigment solution has a quinacridone nucleus, and the pigment solution is a solution in which pigment is dissolved in an alkali aprotic polar solvent.

204 the process for manufacturing a pigment dispersion liquid of item 201 above, wherein a neutralizing agent is contained in the aqueous medium in an amount necessary to neutralize the pigment solution.

205 the process for manufacturing a pigment dispersion liquid of item 201 above, wherein the anionic group is a sulfonic acid group or its salt group.

206 a pigment ink manufactured from a pigment dispersion liquid, wherein the pigment dispersion liquid is prepared by adding a pigment solution, in which pigment is dissolved, to an aqueous dispersion liquid or an aqueous solution in which a pigment derivative having an anionic group is dissolved or dispersed in an aqueous medium.

The present inventors have made an extensive study in order to solve the above problems, and as a result, they have found that a process for manufacturing a pigment dispersion liquid, comprising the step of mixing a solution containing pigment particles and a polymer with a liquid medium in which the pigment particles are insoluble or the step of mixing a solution containing pigment particles with a liquid medium containing a polymer, the pigment particles being insoluble in the liquid medium, provides dispersion particles with a small primary particle size and with high water affinity, and provides dispersion particles with a small particle size without mechanical dispersion processing.

The present invention will be detailed below.

The pigment dispersion liquid described in item 1 above, comprising pigment particles dispersed in a dispersion medium, is characterized in that the difference between $D_{90}$ and $D_{10}$ is not more than 25 nm, and the pigment dispersion liquid described in item 9 above, comprising pigment particles dispersed in a dispersion medium, is characterized in that the polydispersity index (PDI) of the pigment particles represented by formula (1) above is not more than 2.

$D_{90}$, $D_{50}$, $D_{10}$, and polydispersity index (PDI) referred to in the invention are defined as follows:

The polydispersity index (PDI) referred to in the invention is an index defining a primary particle size distribution of dispersed particles, and is defined by formula (1), $$PDI=(D_{90}-D_{10})/D_{50} \qquad \text{formula (1)}$$

wherein $D_{90}$, $D_{50}$, and $D_{10}$ represent the primary particle size in which the integral of the primary particle size distribution function dG=F(D)dD of the pigment particles reaches 0.9 (90% by number), 0.5 (50% by number), and 0.1 (10% by number) of the total pigment particles, respectively, in which G represents a pigment particle number (%) and D represents a primary pigment particle size (nm).

In formula (1), $D_{90}$ represents a primary particle size such that the pigment particles having a primary particle size up to and including $D_{90}$ account for 90% by number of the total particles, $D_{50}$ represents a primary particle size such that the pigment particles having a primary particle size up to and including $D_{50}$ account for 50% by number of the total particles, and $D_{10}$ represents a primary particle size such that the pigment particles having a primary particle size up to and including $D_{10}$ account for 10% by number of the total particles.

The above formula will be explained below employing FIG. 1.

In FIG. 1, the curve of a primary particle size distribution function of the pigment particles is shown in a solid line in a coordinate in which the pigment primary particle size (D) is plotted in the abscissa and the primary particle number (G) corresponding to the size is plotted in an ordinate. Further, in the same coordinate of FIG. 1, the curve of the integral of the primary particle size distribution function is shown in a broken line on which the points of 10%, 50%, and 90% by number of the total primary particles and the points of the primary particle size corresponding to them, $D_{10}$, $D_{50}$ and $D_{90}$ are shown by the crossed lines.

In item 1 above, the difference between $D_{90}$ and $D_{10}$ of not more than 25 nm implies that the difference $\Delta D$ ($D_{90}-D_{10}$) between $D_{90}$ and $D_{10}$ as shown in FIG. 1 is not more than 25 nm. In the invention, the difference is preferably 1 to 20 nm, and more preferably 1 to 15 nm. The pigment dispersion liquid described in item 9 above is characterized in that the polydispersity index (PDI) of the dispersed pigment particles is not more than 2. In the invention, the polydispersity index is preferably 0.2 to 1.8, and more preferably 0.3 to 1.6.

As the particle size distribution is narrower, the PDI approximates to zero. In contrast, as the particle size distribution is broader, that is, polydispersity is greater, the PDI becomes larger.

The particle size distribution can be obtained according to a conventional method, for example, (1) by observing a pigment particle dispersion liquid through a transmission electron microscope, measuring the particle length (or particle size) of about 1000 particles arbitrarily selected and preparing a particle size distribution curve from the measurements, or (2) by an ultracentrifuge for analysis (as described in, for example, W. Maechtle, Makromol. Chem. Vol. 185(1984), p. 1025–1039). PDI can be obtained from calculation of the above measurements.

The PDI values obtained by the above two methods cannot be directly compared to each other, but they are suitable in characterizing a particle size distribution of particles dispersed in a dispersion liquid.

The process for manufacturing the pigment particle dispersion liquid having the characteristic value as defined in item 1 or 9 above is not specifically limited. It is preferred in the invention that during dispersion of pigment particles, a water soluble polymer is used, the water soluble polymer has an anionic polar group, a pigment derivative having a polar group is used, a solution containing pigment particles and a polymer is mixed with a liquid medium in which the pigment particles are insoluble, a solution containing pigment particles is mixed with a liquid medium containing a polymer, the pigment particles being insoluble in the liquid medium, the pigment insoluble liquid medium is an aqueous medium containing water in an amount of at least 50% by weight, or the polymer used is water soluble.

In the pigment dispersion liquid of the invention, the average primary particle size of the pigment particles is preferably not more than 30 nm, more preferably 5 to 30 nm, and most preferably 10 to 25 nm.

Next, pigment used in the present invention will be explained below.

Pigment used in the present invention means an organic pigment having a color. Examples thereof include polycyclic pigment such as quinacridone pigment, phthalocyanine pigment, azo pigment, perylene pigment, anthraquinone pigment, dioxazine pigment, thioindigo pigment, isoindolinone pigment, quinophthalone pigment, and the like; dye lake such as basic dye type lake, acidic dye type lake, and the like; and organic pigment such as nitro pigment, nitroso pigment, aniline black, daylight fluorescent pigment, and the like.

Typical organic pigment is exemplified below.

Listed as pigment for magenta or red, are C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, and the like.

Listed as pigment for orange or yellow, are C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 93, C.I. Pigment Yellow 94, C.I. Pigment Yellow 128, C.I. Pigment Yellow 138, and the like.

Listed as pigment for green or cyan, are C.I. Pigment Blue 15, C.I. Pigment Blue 15:2, C.I. Pigment Blue 15:3, C.I. Pigment Blue 16, C.I. Pigment Blue 60, C.I. Pigment Green 7, and the like.

As solvents for dissolving these pigments, there are acidic solvents or alkaline aprotic polar solvents.

Examples of the acidic solvent include sulfuric acid and sulfonic acids (e.g., methane sulfonic acid, ethane sulfonic acid, etc.). The alkaline aprotic polar solvents herein referred to means aprotic polar solvents containing an aqueous solution of an alkaline compound (e.g., sodium hydroxide, potassium hydroxide, etc.). Examples of the aprotic polar solvents include amides (e.g., formamide, N,N-dimethylformamide, N,N-dimethylacetoamide, etc.); heterocycles (e.g., 2-pyrrolidone, N-methyl-2-pyrrolidone, N-cyclohexyl-2-pyrrolidone, 2-oxazolidone, 1,3-dimethyl-2-imidazolidinone, etc.); sulfoxides (e.g., dimethylsulfoxide, etc.); sulfones (e.g., sulfolane, etc.); and acetonitrile. The preferred are amides, sulfoxides, or acetonitrile.

The pigment dispersion liquid described in item 4 is characterized in that a water soluble polymer is adsorbed on the surface of pigment particles, and the pigment dispersion liquid described in item 5 is characterized in that a water soluble polymer has an anionic polar group. When a water soluble polymer is adsorbed on the surface of the pigment particles, optimal control of the primary particle size is carried out at particle growth during the pigment particle precipitation in the dispersion of pigment to obtain the pigment dispersion liquid comprising pigment particles with a desired particle size or a desired particle size distribution.

The water soluble polymer referred to in the invention is, for example, natural water soluble polymers such as starches of corn or wheat, a cellulose derivatives such as carboxymethylcellulose, methylcellulose, and hydroxymethyl-cellulose, polysaccharides such as sodium alginate, guar gum, tamarind gum, locust bean gum, and gum arabic, or proteins such as gelatin, casein and keratin.

The water soluble polymer is preferably a synthetic polymer. Preferred examples of the synthetic polymer include polyvinyl alcohols; polyvinylpyrrolidones; acryl based resins such as acrylic acid, acrylic acid-acrylonitrile copolymers, potassium acrylate-acrylonitrile copolymers, vinyl acetate-acrylic acid ester copolymers, acrylic acid-acrylic acid ester copolymers, and the like; styrene-acrylic acid resins such as styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, and the like; styrene-sodium styrene sulfonate copolymers, styrene-2-hydroxyethyl acrylate copolymers, styrene-2-hydroxyethyl acrylate-potassium styrene sulfonate copolymers, styrene-maleic acid copolymers, styrene-maleic anhydride copolymers, vinylnaphthalene-acrylic acid copolymers, vinylnaphthalene-maleic acid copolymers; vinyl acetate based copolymers such as vinyl acetate-maleic acid ester copolymers, vinyl acetate-crotonic acid copolymers, vinyl acetate-acrylic acid copolymers, and the like; and salts thereof. Of these, specifically preferred are polyvinylpyrrolidones or vinylpyrrolidone copolymers.

The weight average molecular weight of the water soluble polymer is preferably from 1,000 to 200,000, and is more preferably from 3,000 to 40,000. The weight average molecular weight within the above range minimizes undesired growth or flocculation of the pigment particles, restrains increase in the viscosity of the dispersion liquid increases, and increases solubility of the polymer in a solvent.

The addition amount of the water soluble polymer is preferably from 10 to 1000% by weight, and is more preferably from 50 to 200% by weight, with respect to the total weight of pigments in the pigment solution. The addition amount within the above range minimizes undesired growth or flocculation of the pigment particles, restrains increase in the viscosity of the dispersion liquid, and increases solubility of the polymer in a solvent.

In the invention, the anionic polar group is preferably a unit comprising at least one selected from the group consisting of $-SO_3M$, $-OSO_3M$, $-COOM$, and $-PO(OM_1)_2$, wherein M represents a hydrogen atom, an alkali metal such as Na, K, or Li, an inorganic or organic ammonium such as ammonium or triethanol ammonium, and $M_1$ represents a hydrogen atom, an alkali metal such as Na, K, or Li, or an ammonium group or an organic group substituted ammonium group.

The pigment dispersion liquid described in item 7 is characterized in that the pigment dispersion liquid contains a pigment derivative having a polar group.

The pigment derivative having a polar group herein referred to in the invention means an organic compound having an organic pigment nucleus and a polar group which is bonded directly to the nucleus or bonded to the nucleus through a joint group.

The polar group, which the pigment derivative has, is preferably an anionic group. Examples of the polar group include a sulfonic acid group, a carboxyl group, a phosphate group, a borate group, and a hydroxyl group. In the invention, a sulfonic acid group and a carboxyl group are preferable, and sulfonic acid group is more preferable.

The organic pigment nucleus herein referred to means polycyclic pigment nucleuses such as an anthraquinone nucleus, a dioxazine nucleus, a thioindigo nucleus, a quinacridone nucleus, a phthalocyanine nucleus, a perylene nucleus, an isoindolinone nucleus, a quinophthalone nucleus, and the like. The preferred nucleus is a quinacridone nucleus, a phthalocyanine nucleus, or an anthraquinone nucleus, and the more preferred one is a quinacridone nucleus, or a phthalocyanine nucleus.

Examples of a pigment derivative having a quinacridone nucleus include sulfoquinacridone, disulfoquinacridone, carboxyquinacridone, dicarboxyquinacridone, sulfophenylaminosulfonylquinacridone, and sulfobutylaminosulfonylquinacridone. Examples of a pigment derivative having a phthalocyanine nucleus include sulfophthalocyanine, disulfophthalocyanine, tetrasulfophthalocyanine, dicarboxyphthalocyanine, and tetracarboxyphthalocyanine.

Examples of a pigment derivative having an azo group include sulfonated C.I. Pigment Yellow 74, and sulfonated C.I. Pigment Yellow 128. Examples of a pigment derivative having an isoindolinone nucleus include sulfonated C.I. Pigment Yellow 109, and the like. Examples of a pigment derivative having an anthraquinone nucleus include sulfonated C.I. Pigment Red 168, and the like. Examples of a pigment derivative having a perylene nucleus include sulfonated C.I. Pigment Orange 168, and the like. The pigment derivative having a quinacridone nucleus is especially preferred.

The joint group herein referred to means a divalent linkage group. Examples thereof include a substituted or unsubstituted alkylene group, a substituted or unsubstituted alkenylene group, a substituted or unsubstituted phenylene group, a substituted or unsubstituted heterocyclic group (for example, a furanylene group, a pyrrolylene group or an imidazolylene group), $-O-$, $-COO-$, $-OCO-$, $-SO_2-$, $-SO-$, $-SO_2NH-$, $-NHSO_2-$, $-NHCO-$, $-CONH-$, and $-S-$. The joint group may be a combined group of two or more of these linkage groups.

The polar group may be in the form of a salt. The counter ions for forming a salt include inorganic cations such as a lithium ion, a sodium ion, a potassium ion, a magnesium ion, a calcium ion, an aluminum ion, a nickel ion, and an ammonium ion, and organic cations such as a triethylammonium ion, a diethylammonium ion, a pyridinium ion, and a triethanolammonium ion). The preferred counter ion is a monovalent ion.

These pigment derivatives can be easily synthesized according to conventional methods. There are, for example, a method in which a pigment derivative is synthesized by sulfonating pigment with a sulfonating agent such as sulfuric acid or chlorosulfuric acid, a method in which a pigment derivative is synthesized by sulfonylchlorinating pigment with chlorosulfuric acid and then reacting with amines, and a method in which a pigment derivative is synthesized employing an intermediate compound having a sulfo group.

In the invention, it is preferred that the pigment derivative having a polar group has the same nucleus as the pigment; it is more preferred that the pigment derivative having a polar group and the pigment each have a quinacridone nucleus in their chemical structure; and it is especially preferred that the pigment is dissolved in an alkali aprotic polar solvent to give a pigment solution.

The pigment derivative is added in an amount of preferably 0.1 mol % to 50 mol % based on the pigment dissolved in the pigment solution. The addition amount within the above range of the pigment derivative provides the desired effects of restraining excessive growth or flocculation of the pigment particles.

The pigment dispersion liquid described in item 8 is characterized in that the liquid dispersion medium is an aqueous medium containing water in an amount of at least 50% by weight.

A water-soluble organic solvent may optionally be added to the aqueous medium. Examples of the water-soluble organic solvents include water-soluble alcohols (e.g., methanol, ethanol, 1-propanol, 2-propanol, butanol, isobutanol, sec-butanol, tert-butanol, pentanol, hexanol, cyclohexanol, benzyl alcohol, etc.), water-soluble polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, etc.), and water soluble ketones (for example, acetone, etc.).

The process described in item 16 for manufacturing the pigment dispersion liquid is characterized in that a solution containing pigment particles and a polymer is mixed with a liquid medium in which the pigment particles are insoluble. The process described in item 19 for manufacturing the pigment dispersion liquid is characterized in that a solution containing pigment particles is mixed with a liquid medium containing a polymer, the pigment particles being insoluble in the liquid medium.

The process described in item 20 is characterized in that the pigment-insoluble liquid medium is an aqueous medium containing water in an amount of at least 50% by weight.

The pigment dispersion liquid of the invention preferably contains surfactants in order to increase its dispersion stability.

It is preferred in the pigment dispersion liquid of the invention that a surfactant is adsorbed on the surface of pigment particles. When optimal control of the primary particle size is carried out at particle growth during the pigment particle precipitation in a dispersion medium by adsorbing a surfactant on the surface of the pigment particles, whereby a pigment dispersion liquid comprising pigment particles with a desired particle size or a desired particle size distribution can be obtained. The surfactant herein referred to in the invention implies a compound having a group having an affinity with a hydrophobic surface such as pigment surface and a hydrophilic group which is stabilized in water. The molecular weight of the surfactant is preferably 600 to 3000. The surfactants include an anionic surfactant and a nonionic surfactants. The surfactants are preferably an anionic surfactant, and a nonionic surfactants each having a glycidyloxy chain or an alkyleneoxy chain such as an ethyleneoxy chain or a propyleneoxy chain. Examples of the surfactants include anionic surfactants such as a salt of dialkylsulfosuccinate, a salt of alkylnaphthalenesulfonic acid, and a salt of fatty acids; and nonionic surfactants such as polyoxyethylene alkyl ethers, polyoxyethylene alkylaryl ethers, sulfoalkylpolyoxyethylene aryl ethers, polyoxyethylene aryl ethers, acetylene glycols, polyoxyethylene-polyoxypropylene block copolymers. The surfactant in the invention is preferably a nonionic surfactant, and more preferably polyoxyethylene aryl ethers.

The addition amount of the surfactant is preferably from 10 to 1000% by weight, and is more preferably from 20 to 200% by weight, with respect to the total weight of pigments in the pigment solution. The addition amount within the above range minimizes undesired growth or flocculation of the pigment particles, restrains increase in the viscosity of the dispersion liquid, and increases solubility of the polymer in a solvent.

The process described in item 22 for manufacturing the pigment dispersion liquid is characterized in that a solution containing pigment and a surfactant is mixed with a liquid medium in which the pigment is insoluble to precipitate pigment particles.

The pigment-insoluble liquid medium referred to in the invention is typically water, but may be a mixture of water and the water-soluble organic solvent described above.

Next, a process for manufacturing the pigment particle dispersion liquid of the invention will be explained in detail.

In the invention, pigment is dissolved in the acidic solvent or the alkaline aprotic polar solvent as described above to obtain a pigment solution, and the resulting pigment solution is optionally mixed with a solution containing a polymer or a pigment insoluble medium containing a pigment derivative in a reaction vessel while stirring, and precipitates pigment particles to obtain a pigment dispersion liquid.

The stirring means used in the invention is not specifically limited, but a conventional impeller can be used. Examples of the impellers include a paddle blade, a bent paddle blade, an inclined paddle blade, a propeller blade, a turbine blade, a brumargin blade, an anchor blade, a screw axis blade, a screw band blade, a dissolver blade, and a homomixer blade. Among these are preferable axial flow type stirring blades in which the flow strength in a rotational axis direction can be enhanced by thrust in the rotational axis direction.

In order to uniformly mixing a pigment solution with another solution or a dispersion liquid, the mixing is preferably carried out in a turbulent flow. The turbulent flow is represented by Reinolds' number (Re). Reinolds' number (Re) is defined as a non-dimensional number represented by the following formula:

$$Re = DU\rho/\eta$$

wherein D represents a representative length of an object in a flow, U represents the flow rate, $\rho$ represents density, and $\eta$ represents coefficient of viscosity.

Generally, $Re < 2300$ shows a laminar flow, $Re < 3000$ a transition zone, and $3000 < Re$ a turbulent flow. The turbulent flow shows substantially $3000 < Re$, preferably $5000 < Re$, and more preferably $10000 < Re$. In the invention, the mixing is preferably carried out in a flow of preferably $3000 < Re$, and more preferably $5000 < Re$.

The pigment solution is preferably added to portions free from stagnation in solutions to be stirred, and more preferably added to the vicinity of the stirrer blade stirring in the solutions. An addition nozzle of the pigment solution may be one, but is preferably plural.

In the invention, a mixer may be a dynamic mixer having a stirrer or a static mixer without a stirrer. The static mixer has a point at which the axes of all the supplying pipes and the axes of all the pigment discharging pipes are intersected, and does not have a stirrer inside the pipes. For example, the shape of the pipes may be T-shaped or Y-shaped. In the dynamic or static mixer, the number of nozzles supplying the pigment solution, the pigment derivative solution and an aqueous medium may be one or plural, but each of the pigment solution, the pigment derivative solution and an aqueous medium preferably has one or plural supplying nozzles.

Temperature, at which a pigment solution in which pigment is dissolved is added to an aqueous dispersion liquid or an aqueous solution in which a pigment derivative having a polar group is dissolved or dispersed in an aqueous medium, is not specifically limited, but preferably from 0 to 80° C. Temperature less than 0° C. may solidify water in the aqueous medium, and temperature exceeding 80° C. may markedly grow the pigment particles, and may not provide a desired particle size.

The process described in item 21 for manufacturing the pigment dispersion liquid is characterized in that precipitation and desalting are simultaneously carried out. Desalting referred to in the invention implies a process in which, in the manufacturing process of the pigment dispersion liquid employing polymers, pigment derivatives having a polar group and pigment, salts such as sodium salts, acidic solvents or alkaline aprotic polar solvents are eliminated from the dispersion liquid while or after the pigment dispersion liquid is prepared. As the desalting, various methods such as a centrifugal separation method, a flotation separation method, a sedimentation separation method, an ultrafiltration method, and an electrodialysis method are preferably used. In the invention, an ultrafiltration method is more preferably used.

In the invention, desalting degree of the dispersion liquid is preferably not more than 5,000 $\mu$m/cm, more preferably not more than 3,000 $\mu$m/cm, and most preferably not more than 1,000 $\mu$m/cm, in terms of electric conductivity of the dispersion liquid.

In the invention, the pigment dispersion liquid containing pigment particles with a desired small particle size can be prepared by precipitation, desalting, and concentration, but when satisfactory results are not obtained even by them, additional mechanical dispersing means may be optionally applied. As the mechanical dispersing means, various means such as a disper, a sand mill, a homogenizer, a ball mill and a paint shaker are preferably used.

The pigment dispersion liquid of the invention has a high dispersion stability as compared to conventional ones, but may optionally contain polymeric dispersants in order to further increase its dispersion stability. The polymeric dispersants are not specifically limited. Examples of the polymeric dispersants include styrene-acrylic acid copolymer, and the like.

The solvent used in pigment ink of the invention is preferably a water-soluble organic solvent.

Examples of the solvent used in pigment ink of the invention include alcohols (for example, methanol, ethanol, 1-propanol, 2-propanol, n-butanol, i-butanol, sec-butanol, tert-butanol, pentanol, hexanol, cyclohexanol, benzyl alcohol, etc.); polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol, etc.); polyhydric alcohol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol dimethyl ether, dipropylene glycol monopropyl ether, tripropylene glycol dimethyl ether); amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethyltriamine, tetramethylpropylenediamine, etc.); amides (for example, formamide, N,N-dimethylformamide, N,N-dimethylacetamide, etc.); heterocycles (for example, 2-pyrrolidone, N-methyl-2-pyrrolidone, N-cyclohexyl-2-pyrrolidone, 2-oxazolidone, 1,3- dimethyl-2-imidazolidinone, etc.); sulfoxides (for example, dimethylsulfoxide, etc.); sulfones (for example, sulfolane, etc.); sulfonic acid salts (for example, sodium 1-butane sulfonate, etc.); urea; acetonitrile; and acetone.

The water-soluble organic solvents may be employed singly or as a mixture of two or more kinds thereof.

The pigment ink of the present invention may comprise latexes. Examples of the latexes include styrene-butadiene copolymers, polystyrene, acrylonitrile-butadiene copolymers, acrylic acid ester copolymers, polyurethane, silicone-acryl copolymers, acryl modified fluorine-containing resins, and the like. The latexes may be those in which polymer particles are dispersed in a dispersion medium in the presence or absence of an emulsifying agent. As an emulsifying agent, a surface-active agent is generally used, and a polymer having a water solubilizing group such as a sulfonic acid group or a carboxylic acid group (for example, a graft polymer having a water solubilizing group in the side chain or a polymer obtained by polymerizing a monomer having a water solubilizing group and a water insoluble monomer) is preferably used.

The pigment ink of the present invention preferably contains soap free latexes. The soap free latexes herein referred to mean latexes which are prepared without employing emulsifying agents or latexes are prepared by using a polymer having a water solubilizing group such as a sulfonic acid group or a carboxylic acid group (for example, a graft polymer having a water solubilizing group in the side chain or a polymer obtained by polymerizing a monomer having a water solubilizing group and a water insoluble monomer) as an emulsifying agent.

Recently, other than latexes in which the whole of the latex polymer particles is uniform, there are core-shell type latexes in which the latex polymer particles have the difference in composition between the central portion and the peripheral portion in the polymer particles. In the invention, this type of latex also can be preferably used.

The average particle size of the latex polymer particles used in the pigment ink of the present invention is preferably from 10 to 300 nm, and more preferably from 10 to 100 nm. When the average diameter of the latex polymer particles exceeds 300 nm, glossiness of images recorded tends to be degraded, and when the average particle size is less than 10 nm, water resistance or abrasion resistance may be degraded. It is possible to determine the particle size of the latex polymer particles, employing commercially available particle size measurement apparatus utilizing a light scattering method, an electrophoretic method, a laser Doppler method, and the like.

The latexes are added to the pigment ink of the invention to give its solid content of from 0.1 to 20% by weight, and preferably 0.5 to 10% by weight based on the total weight of the ink. When the content ratio is less than 0.1 percent by weight, it is difficult to achieve sufficient effects regarding water resistance. In contrast, when the content ratio exceeds 20 percent by weight, there occur problems in that the viscosity of the ink tends to increases and the particle size of pigment particles dispersed in the ink tends to increase with an elapse of time, resulting in deterioration of storage stability of the pigment ink.

The pigment ink of the present invention can optionally contain antiseptics, mildewcides, and viscosity regulating agents.

In the pigment ink of the present invention, it is possible to employ electrical conductivity regulating agents which include inorganic salts such as potassium chloride, ammonium chloride, sodium sulfate, sodium nitrate, and sodium chloride, and water-miscible amines such as triethanolamine.

The pigment ink of the present invention can contain viscosity regulating agents, specific resistance regulating agents, film forming agents, ultraviolet light absorbing agents, anti-oxidants, anti-fading agents, rust-proof agents, or antiseptics for the purpose of improvement of ink jetting stability, suitability for an ink cartridge, storage stability, image quality permanence, or other performances.

The ink jet recording mediums used in the invention include plain paper, coated paper, a swell type ink jet recording paper sheet, in which an ink receiving layer capable of absorbing ink and swelling is provided on a paper substrate, a void type ink jet recording paper sheet, in which a porous ink receiving layer is provided on a paper substrate, and ink jet recording resin sheet in which a substrate of resin such as polyethylene terephthalate is used instead of a paper substrate. The ink jet image recording process of item 25 comprises jetting the pigment ink on a porous ink jet recording sheet to form an image, and use of the porous ink jet recording sheet can provide the most excellent performance.

As the porous ink jet recording sheet, there is mentioned a void type ink jet recording paper sheet or a void type ink jet recording resin sheet. These void type ink jet recording sheets are a recording medium in which a void layer capable of absorbing ink is provided on a paper substrate and a recording medium in which a void layer capable of absorbing ink is provided on a resin substrate. The void layer is formed mainly from a hydrophilic binder and flocculated inorganic fine particles.

Various methods are well known which form voids in a layer to obtain a void layer. The methods include one in which a coating solution containing two or more kinds of polymers is coated on a substrate, and allowed to cause phase separation of the polymers during drying to form a void layer, one in which a coating solution containing solid fine particles and a hydrophilic or hydrophobic binder is coated on a substrate, dried to obtain an ink jet recording sheet, and the resulting sheet is immersed in water or an organic solvent to form a void layer, one in which a coating solution containing a compound capable of foaming during layer formation is coated on a substrate, and then the compound is foamed during drying to form a void layer, one in which a coating solution containing porous fine particles and a hydrophilic binder is coated on a substrate to form voids in or between the porous fine particles whereby a void layer is formed, and one in which a coating solution containing a hydrophilic binder and solid fine particles or fine oil drops in an amount by volume identical to or more than the hydrophilic binder is coated on a substrate to form voids between the solid fine particles whereby a void layer is formed. When the pigment ink of the invention is used, a void layer prepared according to any method provided good results.

In the ink image recording process of item 28, the pigment ink comprises pigment particles having an average primary particle size which is not more than 80% of an average void size of the porous ink jet recording sheet. The use of the above pigment ink can perfectly attain the object of the invention.

Employed as ink jet heads, which are employed in the image forming method, may be either an on-demand type or a continuous type. Further, listed as specific examples of ejection systems may be an electrical-mechanical conversion system (for example, a single cavity type, a double cavity type, a bender type, a piston type, a share-mode type, a shared wall type, and the like), an electrostatic attraction system (for example, an electric field controlling type, a slit jet type, and the like), and a discharge system (for example, spark jet type, and the like). Any of these ejection systems may be employed.

EXAMPLES

The present invention will be explained below with reference to examples, but is not limited thereto.

Example 1-1

Preparation of Pigment Dispersion Liquid

Pigment dispersion liquids 1 through 25 were prepared according to the following procedures:

A water soluble polymer was added to a pigment solution (Solution A), and pigment dispersion liquids 2 through 9 were prepared. This procedure was designated as Preparation procedure A.

Preparation of Pigment Dispersion Liquid 1 (Comparative)
(Preparation of Solution A1)

C.I. Pigment Red 122 of 50 g and 9.0 g of Pigment derivative 1 were dissolved in a mixture solvent of 750 g of DMSO (dimethylsulfoxide) and 250 g of an aqueous 10% sodium hydroxide solution, and filtered through a Millipore filter paper of a 1 μm pore diameter. Thus, Solution A1 was obtained.

(Preparation of Solution B1)

Acetic acid of 42.5 g was added to 2075 g of water. Thus, Solution B1 was obtained.

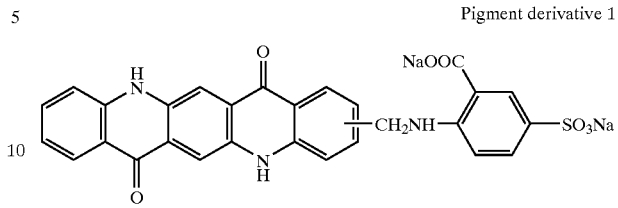

Pigment derivative 1

Preparation of Pigment Dispersion Liquid

Figure 2:
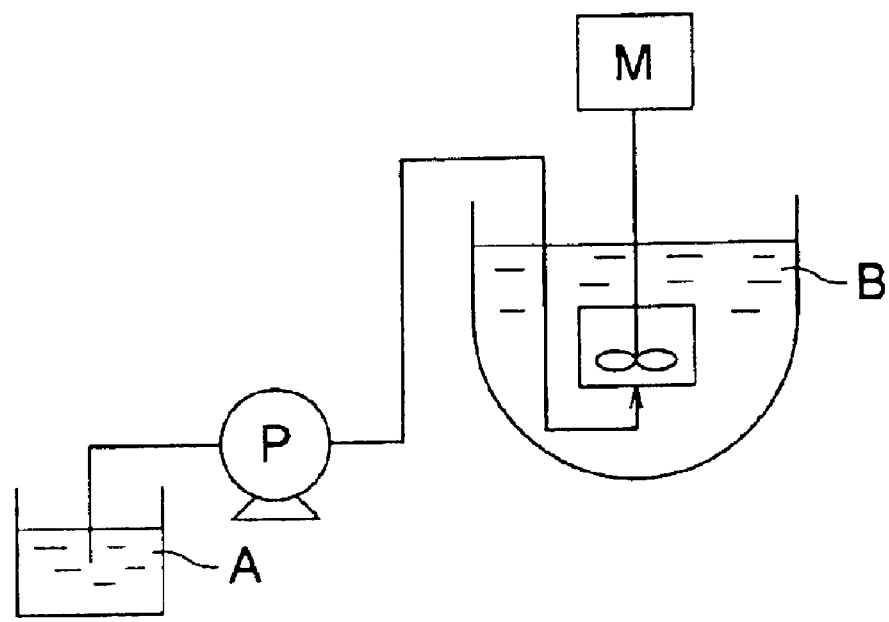
FIG. 2 shows one embodiment of an apparatus for manufacturing a pigment dispersion liquid.

A 4 liter vessel was charged with Solution B1, cooled with ice to 0 to 10° C. Thereafter, Pigment dispersion liquid 1 was prepared employing an apparatus as illustrated in FIG. 2.

Solution B1 as an aqueous medium B was stirred at 5,000 rpm, employing a stirrer Homomixer M in an apparatus T.K. ROBOMICS produced by Tokushu Kika Kogyo Co., Ltd. Thereafter, this apparatus was equipped with a Diaphragm Pump DP-10BPT (produced by Yamada Corporation) and an ultrafiltration membrane Labomodule SIP-1013 (produced by Asahi Kasei Corporation) so that liquid circulation was carried out at a flow rate of 10 liter/minute. Solution A1 as a pigment solution was added to Solution B1 in 30 minutes by means of a roller pump to precipitate pigment fine particles, while the liquid was circulated and ultrafiltered, and at the same time, desalting and concentration were repeated to obtain Pigment dispersion liquid 1 with an electric conductivity of not more than 500 μS/cm and a concentration of 6% by weight.

Preparation of Pigment Dispersion Liquid 2
(Preparation of Solution A2)

C.I. Pigment Red 122 of 50 g and 100 g of polyvinyl pyrrolidone K15 (hereinafter referred to as PVP K15) (molecular weight 10,000, produced by Tokyo Kasei Co., Ltd.) were dissolved in a mixture solvent of 750 g of DMSO (dimethylsulfoxide) and 250 g of an aqueous 10% sodium hydroxide solution, and filtered through a Millipore filter paper of a 1 μm pore diameter. Thus, Solution A2 was obtained.

(Preparation of Pigment Dispersion Liquid)

Pigment dispersion liquid 2 was prepared in the same manner as in Pigment dispersion liquid 1, except that Solution A2 was used instead of Solution A1.

Preparation of Pigment Dispersion Liquid 3
(Preparation of Solution A3)

C.I. Pigment Red 122 of 50 g, 9.0 g of Pigment derivative 1 and 100 g of polyvinyl pyrrolidone were dissolved in a mixture solvent of 750 g of DMSO (dimethylsulfoxide) and 250 g of an aqueous 10% sodium hydroxide solution, and filtered through a Millipore filter paper of a 1 μm pore diameter. Thus, Solution A3 was obtained.

Pigment dispersion liquid 3 was prepared in the same manner as in Pigment dispersion liquid 2, except that Solution A3 was used instead of Solution A2.

Preparation of Pigment Dispersion Liquid 4

Pigment dispersion liquid 4 was prepared in the same manner as in Pigment dispersion liquid 3, except that desalting was carried out according to the following procedures:

A 4 liter vessel was charged with Solution B1, cooled with ice to 0 to 10° C. Thereafter, Pigment dispersion liquid 4 was prepared employing an apparatus as illustrated in FIG. 2.

Solution B1 as an aqueous medium B was stirred at 5,000 rpm, with a stirrer Homomixer M in an apparatus T.K.

ROBOMICS produced by Tokushu Kika Kogyo Co., Ltd. Solution A3 as a pigment solution A was added to Solution B1 in 30 minutes by means of a roller pump P to precipitate pigment fine particles.

Subsequently, the resulting dispersion liquid, in which the pigment fine particles were produced, was ultrafiltered through an ultrafiltration membrane Labomodule SIP-1013 (produced by Asahi Kasei Corporation), while circulated at a flow rate of 10 liter/minute employing a Diaphragm Pump (produced by Yamada Corporation), concentrated, and added with pure water. This process was repeated to obtain Pigment dispersion liquid 4 with an electric conductivity of not more than 500 $\mu$S/cm and a concentration of 6% by weight.

Preparation of Pigment Dispersion Liquids 5 through 7

Pigment dispersion liquids 5 through 7 were prepared in the same manner as in Pigment dispersion liquid 3, except that polyvinyl pyrrolidone-vinyl sulfonic acid copolymer (9/1 weight ratio, hereinafter referred to also as PVP-VS), PVA203, and PVA L3266 as described in Table 1 were used, respectively, instead of PVP (K15) in Solution A3.

PVA203: Polyvinyl alcohol having no anionic polar group, produced by Kuraray Co., Ltd.

PVA L3266: Polyvinyl alcohol modified with sulfonic acid, produced by Nippon Gosei Kagaku Co., Ltd.

Preparation of Pigment Dispersion Liquids 8 and 9

Pigment dispersion liquids 8 and 9 were prepared in the same manner as in Pigment dispersion liquid 3, except that kinds of pigment, solvent or pigment derivative in Solution A3 were changed as described in Table 1. In Table 1, DMF represents dimethylformamide.

Pigment Derivative 2

Cu-phthalocyanine-(SO$_2$NH (CH$_2$)$_2$SO$_3$Na)n by Asahi Kasei Corporation) so that liquid circulation was carried out at a flow rate of 10 liter/minute. Solution A4 as a pigment solution was added to Solution B1 in 30 minutes by means of a roller pump Primary particle size to precipitate pigment fine particles, while the liquid was circulated and ultrafiltered, and at the same time, desalting and concentration were repeated to obtain Pigment dispersion liquid 10 with an electric conductivity of not more than 500 $\mu$S/cm and a concentration of 6% by weight.

Preparation of Pigment Dispersion Liquid 11

(Preparation of Solution A5)

C.I. Pigment Red 122 of 50 g were dissolved in a mixture solvent of 750 g of DMSO (dimethylsulfoxide) and 250 g of an aqueous 10% sodium hydroxide solution, and filtered through a Millipore filter paper of a 1 $\mu$m pore diameter. Thus, Solution A5 was obtained.

(Preparation of Solution B2)

PVP (K15) of 100 g were dissolved in 2075 g of water, and filtered through a Millipore filter paper of a 1 $\mu$m pore diameter. The resulting filtrate was added with 42.5 g of acetic acid. Thus, Solution B2 was obtained.

Preparation of Pigment Dispersion Liquid

Pigment dispersion liquid 11 was prepared in the same manner as in Pigment dispersion liquid 10, except that Solution A5 was used instead of Solution A4, and Solution B2 was instead of Solution B1.

Preparation of Pigment Dispersion Liquid 12

Pigment dispersion liquid 12 was prepared in the same manner as in Pigment dispersion liquid 10, except that Solution B2 was used instead of Solution B1.

Pigment derivative 3

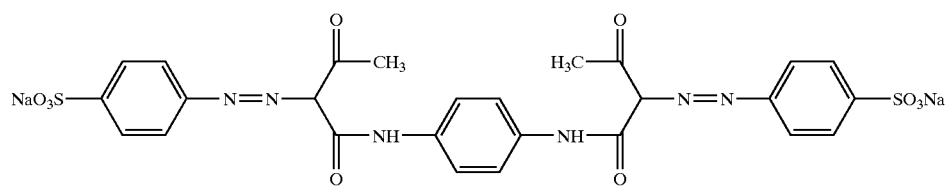

A water soluble polymer was added to an aqueous medium (Solution B), and pigment dispersion liquids 10 through 22 were prepared. This procedure was designated as Preparation procedure B.

Preparation of Pigment Dispersion Liquid 10 (Comparative)

(Preparation of Solution A4)

C.I. Pigment Red 122 of 50 g and 9.0 g of Pigment derivative 1 were dissolved in a mixture solvent of 750 g of DMSO (dimethylsulfoxide) and 250 g of an aqueous 10% sodium hydroxide solution, and filtered through a Millipore filter paper of a 1 $\mu$m pore diameter. Thus, Solution A4 was obtained.

(Preparation of Pigment Dispersion Liquid 10)

A 4 liter vessel was charged with Solution B1, cooled with ice to 0 to 10° C. Thereafter, Pigment dispersion liquid 10 was prepared employing an apparatus as illustrated in FIG. 2.

Solution B1 as an aqueous medium B was stirred at 5,000 rpm, employing a stirrer Homomixer M in an apparatus T.K. ROBOMICS produced by Tokushu Kika Kogyo Co., Ltd. Thereafter, this apparatus was equipped with a Diaphragm Pump DP-10BPT (produced by Yamada Corporation) and an ultrafiltration membrane Labomodule SIP-1013 (produced Preparation of Pigment Dispersion Liquid 13

Pigment dispersion liquid 13 was prepared in the same manner as in Pigment dispersion liquid 12, except that desalting was carried out according to the following procedures:

A 4 liter vessel was charged with Solution B2, cooled with ice to 0 to 10° C. Thereafter, Pigment dispersion liquid 13 was prepared employing an apparatus as illustrated in FIG. 2.

Solution B2 as an aqueous medium B was stirred at 5,000 rpm, employing a stirrer Homomixer M in an apparatus T.K. Robomix produced by Tokushu Kika Kogyo Co., Ltd. Solution A5 as a pigment solution A was added to Solution B2 in 30 minutes by means of a roller pump P to precipitate pigment fine particles.

Subsequently, the resulting dispersion liquid, in which the pigment fine particles were produced, was ultrafiltered through an ultrafiltration membrane Labomodule SIP-1013 (produced by Asahi Kasei Corporation), while circulated at a flow rate of 10 liter/minute employing a Diaphragm Pump DP-10BPT (produced by Yamada Corporation), concentrated, and added with pure water. This process was repeated to obtain Pigment dispersion liquid 13 with an electric conductivity of not more than 500 μS/cm and a concentration of 6% by weight.

Preparation of Pigment Dispersion Liquids 14 through 22

Pigment dispersion liquids 14 through 22 were prepared in the same manner as in Pigment dispersion liquid 12, except that kinds of pigment, pigment derivative or a solvent in a pigment solution (Solution A) and kinds of a water soluble polymer in an aqueous medium (Solution B) were changed as described in Table 1.

In the water soluble polymers described in Table 1, PVA SK5102 represents polyvinyl alcohol modified with carboxylic acid, produced by Kuraray Co., Ltd., and CMC 1105 represents carboxymethyl cellulose, produced by Daicell Co., Ltd.

Further, Pigment dispersion liquids 23 through 25 (comparative) were prepared according to a salt milling procedure. This procedure was designated as Preparation procedure C.

Preparation of Pigment Dispersion Liquid 23

C.I. Pigment Red 122 of 50 g, 500 g of sodium chloride and 50 g of diethylene glycol were placed in a stainless steel gallon kneader, and kneaded at 60° C. for 180 minutes.

The resulting kneaded mixture was washed with water, and further mixed with 9.0 g of pigment derivative 1 and 1000 g of water. The resulting mixture was dispersed in a sand grinder containing zirconia beads with a diameter of 0.5 mm in an amount by volume of 50%. Thus, Pigment dispersion liquid 23 was obtained.

Preparation of Pigment Dispersion Liquids 24 and 25

Pigment dispersion liquids 24 and 25 were prepared in the same manner as in Pigment dispersion liquid 23, except kinds of kinds of pigment or pigment derivative were changed as shown in Table 1.

Evaluation of Pigment Dispersion Liquid (Measurement of a Primary Particle Size of Dispersed Particles)

Each of the pigment dispersion liquids obtained above was observed by means of a transmission electron microscope, and the particle length of each of 1,000 primary particles arbitrarily selected was measured and the average primary particle size was computed. Herein, the primary particle size means the particle length of the primary particles.

(Determination of $D_{90}$, $D_{50}$ and $D_{10}$, and PDI)

Based on the above measurement of the particle size, the curve of a primary particle size distribution function of the pigment particles and the integral curve are prepared in a coordinate in which the pigment primary particle size (D) is plotted in the abscissa and the primary particle number function (G) corresponding to the size is plotted in an ordinate. From the integral curve were obtained $D_{90}$, $D_{50}$, and $D_{10}$ each representing a primary particle size such that the pigment particles having a primary particle size up to and including $D_{90}$ account for 90% by number of the total particles, a primary particle size such that the pigment particles having a primary particle size up to and including $D_{50}$ account for 50% by number of the total particles, and a primary particle size such that the pigment particles having a primary particle size up to and including $D_{10}$ account for 10% by number of the total particles, respectively. Further, $(D_{90}-D_{10})$ and a polydispersity index (PDI) of the pigment particles represented by formula (1) above were obtained.

The results are shown in Table 1.

TABLE 1

| Pigment dispersion liquid No. | Preparation procedure | Kinds of pigment | Water soluble polymer | Solvent of Solution A | Pigment derivative used | Desalting | Average primary particle size (nm) | $D_{10}$ | $D_{90}$ | $D_{90}-D_{10}$ | PDI | Remarks |
|---|---|---|---|---|---|---|---|---|---|---|---|---|
| 1 | A | Pigment Red 122 | — | DMSO | 1 | *S | 23 | 4 | 50 | 46 | 2.30 | Comp. |
| 2 | A | Pigment Red 122 | PVP(K15) | DMSO | — | S | 18 | 7 | 25 | 18 | 1.00 | Inv. |
| 3 | A | Pigment Red 122 | PVP(K15) | DMSO | 1 | S | 13 | 5 | 21 | 16 | 1.23 | Inv. |
| 4 | A | Pigment Red 122 | PVP(K15) | DMSO | 1 | **P | 13 | 5 | 21 | 16 | 1.23 | Inv. |
| 5 | A | Pigment Red 122 | PVP-VS | DMSO | 1 | S | 10 | 4 | 15 | 11 | 1.10 | Inv. |
| 6 | A | Pigment Red 122 | PVA203 | DMSO | 1 | S | 15 | 6 | 22 | 16 | 1.07 | Inv. |
| 7 | A | Pigment Red 122 | PVAL3266 | DMSO | 1 | S | 10 | 4 | 14 | 10 | 1.00 | Inv. |
| 8 | A | Pigment Blue 15:3 | PVP(K15) | ***Py | 2 | S | 14 | 7 | 22 | 15 | 1.07 | Inv. |
| 9 | A | Pigment Yellow 128 | PVP(K15) | DMF | 3 | S | 13 | 5 | 23 | 18 | 1.38 | Inv. |
| 10 | B | Pigment Red 122 | — | DMSO | 1 | S | 22 | 5 | 53 | 48 | 2.18 | Comp. |
| 11 | B | Pigment Red 122 | PVP(K15) | DMSO | — | S | 19 | 6 | 24 | 18 | 0.95 | Inv. |
| 12 | B | Pigment Red 122 | PVP(K15) | DMSO | 1 | S | 13 | 5 | 20 | 15 | 1.15 | Inv. |
| 13 | B | Pigment Red 122 | PVP(K15) | DMSO | 1 | P | 13 | 5 | 20 | 15 | 1.15 | Inv. |
| 14 | B | Pigment Red 122 | PVP-VS | DMSO | 1 | S | 10 | 4 | 14 | 10 | 1.00 | Inv. |
| 15 | B | Pigment Red 122 | PVA203 | DMSO | 1 | S | 17 | 7 | 27 | 20 | 1.18 | Inv. |
| 16 | B | Pigment Red 122 | PVAL3266 | DMSO | 1 | S | 11 | 4 | 15 | 11 | 1.00 | Inv. |
| 17 | B | Pigment Red 122 | PVASK5102 | DMSO | 1 | S | 12 | 7 | 19 | 12 | 1.00 | Inv. |
| 18 | B | Pigment Red 122 | CMC1105 | DMSO | 1 | S | 12 | 7 | 20 | 13 | 1.08 | Inv. |
| 19 | B | Pigment Blue 15:3 | PVP(K15) | Py | 2 | S | 16 | 7 | 23 | 16 | 1.00 | Inv. |
| 20 | B | Pigment Blue 15:3 | PVA203 | Py | 2 | S | 17 | 6 | 24 | 18 | 1.06 | Inv. |
| 21 | B | Pigment Yellow 128 | PVP(K15) | DMF | 3 | S | 14 | 5 | 24 | 19 | 1.36 | Inv. |
| 22 | B | Pigment Yellow 128 | PVA203 | DMF | 3 | S | 18 | 6 | 26 | 20 | 1.11 | Inv. |
| 23 | C | Pigment Red 122 | PVP(K15) | — | 1 | S | 33 | 7 | 75 | 68 | 2.06 | Comp. |
| 24 | C | Pigment Blue 15:3 | PVP(K15) | — | 2 | S | 41 | 5 | 91 | 86 | 2.10 | Comp. |
| 25 | C | Pigment Yellow 128 | PVP(K15) | — | 3 | S | 44 | 5 | 98 | 93 | 2.11 | Comp. |

*"S" means that precipitation and desalting are simultaneously carried out.
***"P" means that precipitation is carried out, and then desalting are carried out.
****"Py" means pyridine.

As is apparent from Table 1 above, inventive pigment dispersion liquids provided a small primary particle size and an extremely narrow particle size distribution as compared with comparative pigment dispersion liquids.

Example 1-2

Preparation of Pigment Inks 1 to 25

Pigment inks 1 through 25 were prepared from pigment dispersion liquids 1 to 25, respectively, as follows:

| | |
|---|---|
| Pigment dispersion liquids 1 to 25 | 160 g |
| Diethylene glycol | 180 g |
| Glycerin | 80 g |
| PELEX OT-P (produced by Kao Corp.) | 5 g |
| PROXEL GXL (produced by Zeneca Limited) | 2 g |

Deionized water was added to the above composition to make 1,000 g, and the resulting pigment ink was filtered two times through a Millipore filter of a 1 μm pore diameter. Thus, pigment inks 1 through 25 were prepared.

(Image Recording on Recording Sheet)

Using an on-demand type ink jet printer with a maximum recording density of 720×720 dpi, installed with a piezo-electric type print-head having a nozzle orifice diameter of 20 μm, a driving frequency of 12 kHz, a nozzle number of 128 per one color and a nozzle density among the same colors of 180 dpi, uniform image patterns 1 through 25 giving a reflection density of 1.0 were recorded on a plain paper sheet and a porous paper sheet having voids with an average void size of 0.03 μm. The term, "dpi" herein referred to represents a dot number per 2.54 cm.

Evaluation of Pigment Ink and Output Image (Evaluation of Dispersion Stability)

The particle size of the particles of each pigment ink was measured employing Zetasizer 1000 (produced by Malvern Instruments Co., Ltd.). Subsequently, 100 ml of the pigment ink was placed in a tightly closed vessel so that evaporation of the ink solvent did not occur, allowed to stand at 60° C. in a thermostat for one week, and the particle size of the particles of the resulting pigment ink was again measured employing Zetasizer 1000. Then, the variation rate of the particle size of the particles in the resulting ink was determined. Evaluation of dispersion stability was carried out according to the following criteria:

A: The variation rate of the particle size was less than 10%.
B: The variation rate of the particle size was in the range of 10 to 50%.
C: The variation rate of the particle size was more than 50%.

(Evaluation of Ink Recording Head Nozzle Clogging)

Employing a piezo type ink recording head having nozzles with a nozzle diameter of 20 μ, pigment ink was continuously jetted in an amount of 12 pl per one droplet for one week without cleaning of the nozzles, and then the nozzles were observed. Evaluation of the ink recording head nozzle clogging was carried out according to the following criteria:

A: Ink was jetted normally from all of the nozzles.
B: One to three nozzles were clogged, but the clogged nozzles were cleaned by suction.
C: Four or more nozzles were clogged, and one or more clogged nozzles could not be cleaned by suction.

(Evaluation of Bronzing)

Bronzing was visually observed according to the following criteria:

A: Bronzing was scarcely observed.
B: Slight bronzing was observed, but was not problematic.
C: Bronzing problematic for practical use was observed
D: Marked bronzing was observed.

(Evaluation of Glossiness)

Image clarity (Gloss value, C value %) of the image pattern obtained above was measured at a reflection angle of 60° and at an optical wedge with a width of 2 mm, employing an image-clarity measuring machine ICM-lDP (produced by Suga Shiken Kikai Co., Ltd.). Evaluation was carried out according to the following criteria:

A: The C value % was not less than 61.
B: The C value % was in the range of 61 to 50.
C: The C value % was in the range of 50 to 41.
D: The C value % was not more than 40.

In the above evaluation, rankings A and B were judged as being practically preferable.

The results are shown in Table 2.

TABLE 2

| Image No. | Pigment ink No. | Dispersion stability | Nozzle clogging | Plain paper sheet | | Porous paper sheet | | Remarks |
|---|---|---|---|---|---|---|---|---|
| | | | | Bronzing | Glossiness | Bronzing | Glossiness | |
| 1 | 1 | B | B | C | C | D | C | Comp. |
| 2 | 2 | B | B | B | B | B | B | Inv. |
| 3 | 3 | A | A | B | B | A | A | Inv. |
| 4 | 4 | B | B | B | B | B | B | Inv. |
| 5 | 5 | A | A | B | B | A | A | Inv. |
| 6 | 6 | A | A | B | B | B | B | Inv. |
| 7 | 7 | A | A | B | B | A | A | Inv. |
| 8 | 8 | A | A | B | B | A | A | Inv. |
| 9 | 9 | A | A | B | B | A | A | Inv. |
| 10 | 10 | B | B | C | C | D | C | Comp. |
| 11 | 11 | B | B | B | B | B | B | Inv. |
| 12 | 12 | A | A | B | B | A | A | Inv. |
| 13 | 13 | B | B | B | B | B | B | Inv. |
| 14 | 14 | A | A | B | B | A | A | Inv. |
| 15 | 15 | A | A | B | B | B | B | Inv. |
| 16 | 16 | A | A | B | B | A | A | Inv. |
| 17 | 17 | A | A | B | B | A | A | Inv. |
| 18 | 18 | A | A | B | B | A | A | Inv. |
| 19 | 19 | A | A | B | B | A | A | Inv. |

TABLE 2-continued

| Image No. | Pigment ink No. | Dispersion stability | Nozzle clogging | Plain paper sheet Bronzing | Plain paper sheet Glossiness | Porous paper sheet Bronzing | Porous paper sheet Glossiness | Remarks |
|---|---|---|---|---|---|---|---|---|
| 20 | 20 | A | A | B | B | B | B | Inv. |
| 21 | 21 | A | A | B | B | A | A | Inv. |
| 22 | 22 | A | A | B | B | B | B | Inv. |
| 23 | 23 | C | C | D | C | D | D | Comp. |
| 24 | 24 | C | C | D | C | D | D | Comp. |
| 25 | 25 | C | C | D | C | D | D | Comp. |

Inv.: Inventive, Comp. Comparative

As is apparent from Table 2 above, inventive pigment inks comprising pigment particles having the average primary particle size, ($D_{90}-D_{10}$), or PDI as specified in the invention provide good dispersion stability, good resistance to nozzle clogging during ink jetting, images with minimized bronzing and good glossiness, as compared with comparative pigment inks. Particularly when inventive pigment inks were jetted on the porous paper sheet to form an image, the image exhibits especially good results.

Example 1-3
Preparation of Pigment Inks 26 to 50

Pigment inks 26 through 50 were prepared in the same manner as in Pigment inks 1 through 25 of Example 2, except that BLAUNON DP-9 ($C_{12}H_{25}Ph(CH_2CH_2O)_9H$, produced by AOKI OIL INDUSTRIAL CO., LTD.) was used instead of PELEX OT-P. The resulting pigment inks were evaluated in the same manner as in Example 1-2. The results are shown in Table 3.

As is apparent from Table 3 above, inventive pigment inks comprising pigment particles having the average primary particle size, ($D_{90}-D_{10}$), or PDI as specified in the invention provide good dispersion stability, good resistance to nozzle clogging during ink jetting, images with minimized bronzing and good glossiness, as compared with comparative pigment inks. Particularly when inventive pigment inks were jetted on the porous paper sheet to form an image, the image exhibits especially good results.

Example 1-4
Preparation of Pigment Inks 51 to 75

Pigment inks 51 through 75 were prepared in the same manner as in pigment inks 1 through 25 of Example 2, except that HITENOL NE-15 ($RPhO(CH_2CH_2O)_{20}OSO_3NH_4$, produced by Dai-ichi Kogyo Seiyaku Co., Ltd.) was used instead of PELEX OT-P. The resulting pigment inks were evaluated in the same manner as in Example 1-2. The results are shown in Table 4.

TABLE 3

| Image No. | Pigment ink No. | Dispersion stability | Nozzle clogging | Plain paper sheet Bronzing | Plain paper sheet Glossiness | Porous paper sheet Bronzing | Porous paper sheet Glossiness | Remarks |
|---|---|---|---|---|---|---|---|---|
| 26 | 26 | B | B | C | C | D | C | Comp. |
| 27 | 27 | B | A | B | B | A | B | Inv. |
| 28 | 28 | A | A | B | B | A | A | Inv. |
| 29 | 29 | B | B | B | B | B | A | Inv. |
| 30 | 30 | A | A | B | B | A | A | Inv. |
| 31 | 31 | A | A | B | B | B | B | Inv. |
| 32 | 32 | A | A | B | B | A | A | Inv. |
| 33 | 33 | A | A | B | B | A | A | Inv. |
| 34 | 34 | A | A | B | B | A | A | Inv. |
| 35 | 35 | B | B | C | C | D | C | Comp. |
| 36 | 36 | B | B | B | B | B | B | Inv. |
| 37 | 37 | A | A | B | B | A | A | Inv. |
| 38 | 38 | B | A | B | B | A | B | Inv. |
| 39 | 39 | A | A | B | B | A | A | Inv. |
| 40 | 40 | A | A | B | B | B | B | Inv. |
| 41 | 41 | A | A | B | B | A | A | Inv. |
| 42 | 42 | A | A | B | B | A | A | Inv. |
| 43 | 43 | A | A | B | B | A | A | Inv. |
| 44 | 44 | A | A | B | B | A | A | Inv. |
| 45 | 45 | A | A | B | B | A | B | Inv. |
| 46 | 46 | A | A | B | B | A | A | Inv. |
| 47 | 47 | A | A | B | B | B | B | Inv. |
| 48 | 48 | C | C | D | C | D | D | Comp. |
| 49 | 49 | C | C | D | C | D | D | Comp. |
| 50 | 50 | C | C | D | C | D | D | Comp. |

Inv.: Inventive, Comp. Comparative

TABLE 4

| Image No. | Pigment ink No. | Dispersion stability | Nozzle clogging | Plain paper sheet Bronzing | Plain paper sheet Glossiness | Porous paper sheet Bronzing | Porous paper sheet Glossiness | Remarks |
|---|---|---|---|---|---|---|---|---|
| 51 | 51 | B | B | C | C | D | C | Comp. |
| 52 | 52 | B | A | B | B | A | B | Inv. |
| 53 | 53 | A | A | B | B | A | A | Inv. |
| 54 | 54 | B | B | B | B | B | A | Inv. |
| 55 | 55 | A | A | B | B | A | A | Inv. |
| 56 | 56 | A | A | B | B | B | B | Inv. |
| 57 | 57 | A | A | B | B | A | A | Inv. |
| 58 | 58 | A | A | B | B | A | A | Inv. |
| 59 | 59 | A | A | B | B | A | A | Inv. |
| 60 | 60 | B | B | C | C | D | C | Comp. |
| 61 | 61 | A | A | B | B | A | B | Inv. |
| 62 | 62 | A | A | B | B | A | A | Inv. |
| 63 | 63 | B | B | B | B | A | B | Inv. |
| 64 | 64 | A | A | B | B | A | A | Inv. |
| 65 | 65 | A | A | B | B | B | B | Inv. |
| 66 | 66 | A | A | B | B | A | A | Inv. |
| 67 | 67 | A | A | B | B | A | A | Inv. |
| 68 | 68 | A | A | B | B | A | A | Inv. |
| 69 | 69 | A | A | B | B | A | A | Inv. |
| 70 | 70 | A | A | B | B | A | B | Inv. |
| 71 | 71 | A | A | B | B | A | A | Inv. |
| 72 | 72 | A | A | B | B | B | B | Inv. |
| 73 | 73 | C | C | D | C | D | D | Comp. |
| 74 | 74 | C | C | D | C | D | D | Comp. |
| 75 | 75 | C | C | D | C | D | D | Comp. |

Inv.: Inventive, Comp. Comparative

As is apparent from Table 4 above, inventive pigment inks comprising pigment particles having the average primary particle size, ($D_{90}$–$D_{10}$), or PDI as specified in the invention provide good dispersion stability, good resistance to nozzle clogging during ink jetting, images with minimized bronzing and good glossiness, as compared with comparative pigment inks. Particularly when inventive pigment inks were jetted on the porous paper sheet to form an image, the image exhibits especially good results.

Example 2-1
Preparation of Pigment Dispersion Liquid

Pigment dispersion liquids 2-1 through 2-26 were prepared according to the following procedures:

A surfactant was added to a pigment solution (Solution A'), and pigment dispersion liquids 2-2 through 2-9 were prepared. This procedure was designated as Preparation procedure A'.

Preparation of Pigment Dispersion Liquid 2-1 (Comparative)
(Preparation of Solution A'1)

C.I. Pigment Red 122 of 50 g and 9.0 g of Pigment derivative 2-1 were dissolved in a mixture solvent of 750 g of DMSO (dimethylsulfoxide) and 250 g of an aqueous 10% sodium hydroxide solution, and filtered through a Millipore filter paper of a 1 μm pore diameter. Thus, Solution A'1 was obtained.

(Preparation of Solution B'1)

Acetic acid of 42.5 g was added to 2075 g of water. Thus, Solution B'1 was obtained.

(Preparation of Pigment Dispersion Liquid)

A 4 liter vessel was charged with Solution B'1, cooled with ice to 0 to 10° C. Thereafter, Pigment dispersion liquid 2-1 was prepared employing an apparatus as illustrated in FIG. 2.

Solution B'1 as an aqueous medium B was stirred at 5,000 rpm, employing a stirrer Homomixer M in an apparatus T.K. ROBOMICS produced by Tokushu Kika Kogyo Co., Ltd. Thereafter, this apparatus was equipped with a Diaphragm Pump DP-l0BPT (produced by Yamada Corporation) and an ultrafiltration membrane Labomodule SIP-1013 (produced by Asahi Kasei Corporation) so that liquid circulation was carried out at a flow rate of 10 liter/minute. Solution A'1 as a pigment solution was added to Solution B'1 in 30 minutes by means of a roller pump to precipitate pigment fine particles, while the liquid was circulated and ultrafiltered, and at the same time, desalting and concentration were repeated to obtain Pigment dispersion liquid 2-1 with an electric conductivity of not more than 500 μS/cm and a concentration of 6% by weight.

Preparation of Pigment Dispersion Liquid 2-2
(Preparation of Solution A'2)

C.I. Pigment Red 122 of 50 g and 100 g of surfactant SA-1 were dissolved in a mixture solvent of 750 g of DMSO (dimethylsulfoxide) and 250 g of an aqueous 10% sodium hydroxide solution, and filtered through a Millipore filter paper of a 1 μm pore diameter. Thus, Solution A'2 was obtained.

(Preparation of Pigment Dispersion Liquid)

Pigment dispersion liquid 2-2 was prepared in the same manner as in Pigment dispersion liquid 2-1, except that Solution A'2 was used instead of Solution A'1.

Preparation of Pigment Dispersion Liquid 2-3
(Preparation of Solution A'3)

C.I. Pigment Red 122 of 50 g, 9.0 g of Pigment derivative 2-1 and 100 g of SA-1 were dissolved in a mixture solvent of 750 g of DMSO (dimethylsulfoxide) and 250 g of an aqueous 10 sodium hydroxide solution, and filtered through a Millipore filter paper of a 1 μm pore diameter. Thus, Solution A'3 was obtained.

Pigment dispersion liquid 2-3 was prepared in the same manner as in Pigment dispersion liquid 2-2, except that Solution A'3 was used instead of Solution A'2.

Preparation of Pigment Dispersion Liquid 2-4

Pigment dispersion liquid 2-4 was prepared in the same manner as in Pigment dispersion liquid 2-3, except that desalting was carried out according to the following procedures:

A 4 liter vessel was charged with Solution B'1, cooled with ice to 0 to 10° C. Thereafter, Pigment dispersion liquid 2-4 was prepared employing an apparatus as illustrated in FIG. 2.

Solution B'1 as an aqueous medium B was stirred at 5,000 rpm, with a stirrer Homomixer M in an apparatus T.K. ROBOMICS produced by Tokushu Kika Kogyo Co., Ltd. Solution A'3 as a pigment solution A was added to Solution B'1 in 30 minutes by means of a roller pump P to precipitate pigment fine particles.

Subsequently, the resulting dispersion liquid, in which the pigment fine particles were produced, was ultrafiltered through an ultrafiltration membrane Labomodule SIP-1013 (produced by Asahi Kasei Corporation), while circulated at a flow rate of 10 liter/minute employing a Diaphragm Pump DP-10BPT (produced by Yamada Corporation), concentrated, and added with pure water. This process was repeated to obtain Pigment dispersion liquid 2-4 with an electric conductivity of not more than 500 µS/cm and a concentration of 6% by weight.

Preparation of Pigment Dispersion Liquids 2-5 through 2-7

Pigment dispersion liquids 2-5 through 2-7 were prepared in the same manner as in Pigment dispersion liquid 2-3, except that SA-2, SA-3 and SA-4 as described in Table 2-1 were used, respectively, instead of SA-1 of Solution A'3.

Preparation of Pigment Dispersion Liquids 2-8 and 2-9

Pigment dispersion liquids 2-8 and 2-9 were prepared in the same manner as in Pigment dispersion liquid 2-3, except that kinds of pigment, solvent or pigment derivative in Solution A'3 were changed as described in Table 2-1. In Table 2-1, DMF represents dimethylformamide.

A surfactant was added to an aqueous medium (Solution B'), and pigment dispersion liquids 2-11 through 2-22 were prepared. This procedure was designated as Preparation procedure B'.

Preparation of Pigment Dispersion Liquid 2-10 (Comparative)

(Preparation of Solution A'4)

C.I. Pigment Red 122 of 50 g and 9.0 g of Pigment derivative 2-1 were dissolved in a mixture solvent of 750 g of DMSO (dimethylsulfoxide) and 250 g of an aqueous 10% sodium hydroxide solution, and filtered through a Millipore filter paper of a 1 µm pore diameter. Thus, Solution A'4 was obtained.

(Preparation of Pigment Dispersion Liquid 2-10)

A 4 liter vessel was charged with Solution B'1, cooled with ice to 0 to 10° C. Thereafter, Pigment dispersion liquid 2-10 was prepared employing an apparatus as illustrated in FIG. 2.

Solution B'1 as an aqueous medium B was stirred at 5,000 rpm, employing a stirrer Homomixer M in an apparatus T.K. ROBOMICS produced by Tokushu Kika Kogyo Co., Ltd. Thereafter, this apparatus was equipped with a Diaphragm Pump DP-10BPT (produced by Yamada Corporation) and an ultrafiltration membrane Labomodule SIP-1013 (produced by Asahi Kasei Corporation) so that liquid circulation was carried out at a flow rate of 10 liter/minute. Solution A'4 as a pigment solution was added to Solution B'1 in 30 minutes by means of a roller pump Primary particle size to precipitate pigment fine particles, while the liquid was circulated and ultrafiltered, and at the same time, desalting and concentration were repeated to obtain Pigment dispersion liquid 2-10 with an electric conductivity of not more than 500 µS/cm and a concentration of 6% by weight.

Preparation of Pigment Dispersion Liquid 2-11

(Preparation of Solution A'5)

C.I. Pigment Red 122 of 50 g were dissolved in a mixture solvent of 750 g of DMSO (dimethylsulfoxide) and 250 g of

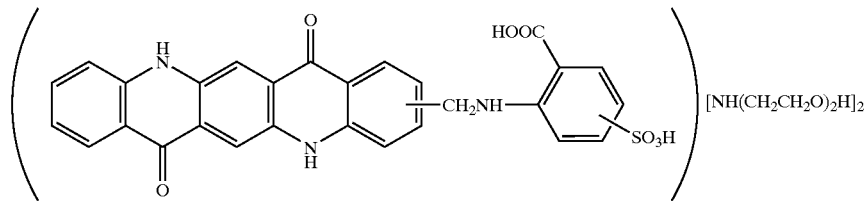

Pigment derivative 2-1

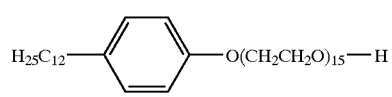

Surfactant SA-1

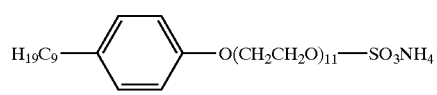

Surfactant SA-2

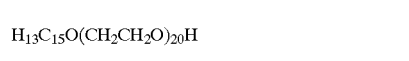

Surfactant SA-3

H$_{13}$C$_{15}$O(CH$_2$CH$_2$O)$_{20}$H

Surfactant SA-4

H$_{31}$C$_{15}$O(CH$_2$CH$_2$O)$_{15}$SO$_3$NH$_4$ an aqueous 10% sodium hydroxide solution, and filtered through a Millipore filter paper of a 1 µm pore diameter. Thus, Solution A'5 was Obtained.

(Preparation of Solution B'2)

SA-1 of 100 g were dissolved in 2075 g of water, and filtered through a Millipore filter paper of a 1 µm pore diameter. The resulting filtrate was added with 42.5 g of acetic acid. Thus, Solution B'2 was obtained.

Preparation of Pigment Dispersion Liquid

Pigment dispersion liquid 2-11 was prepared in the same manner as in Pigment dispersion liquid 2-10, except that Solution A'5 was used instead of Solution A'4, and Solution B'2 was instead of Solution B'1.

Preparation of Pigment Dispersion Liquid 2-12

Pigment dispersion liquid 2-12 was prepared in the same manner as in Pigment dispersion liquid 2-10, except that Solution B'2 was used instead of Solution B'1.

Preparation of Pigment Dispersion Liquid 2-13

Pigment dispersion liquid 2-13 was prepared in the same manner as in Pigment dispersion liquid 2-12, except that desalting was carried out according to the following procedures:

A 4 liter vessel was charged with Solution B'2, cooled with ice to 0 to 10° C. Thereafter, Pigment dispersion liquid 2-13 was prepared employing an apparatus as illustrated in FIG. 2.

Solution B'2 as an aqueous medium B was stirred at 5,000 rpm, employing a stirrer Homomixer M in an apparatus T.K. Robomix produced by Tokushu Kika Kogyo Co., Ltd. Solution A'5 as a pigment solution A was added to Solution B'2 in 30 minutes by means of a roller pump P to precipitate pigment fine particles.

Subsequently, the resulting dispersion liquid, in which the pigment fine particles were produced, was ultrafiltered through an ultrafiltration membrane Labomodule SIP-1013 (produced by Asahi Kasei Corporation), while circulated at a flow rate of 10 liter/minute employing a Diaphragm Pump DP-10BPT (produced by Yamada Corporation), concentrated, and added with pure water. This process was repeated to obtain Pigment dispersion liquid 2-13 with an electric conductivity of not more than 500 $\mu$S/cm and a concentration of 6% by weight.

Preparation of Pigment Dispersion Liquids 2-14 through 2-23

Pigment dispersion liquids 2-14 through 2-23 were prepared in the same manner as in Pigment dispersion liquid 2-12, except that kinds of pigment, pigment derivative or a solvent in a pigment solution (Solution A) and kinds of a water soluble polymer in an aqueous medium (Solution B) were changed as described in Table 2-1.

In Table 2-1, SA-5, SA-6 and SA-7 have the following structures.

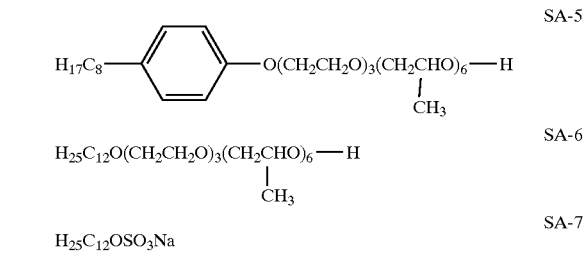

Further, Pigment dispersion liquids 2-24 through 2-26 (comparative) were prepared according to a salt milling procedure. This procedure was designated as Preparation procedure C'.

Preparation of Pigment Dispersion Liquid 2-24

C.I. Pigment Red 122 of 50 g, 500 g of sodium chloride and 50 g of diethylene glycol were placed in a stainless steel gallon kneader, and kneaded at 60° C. for 180 minutes.

The resulting kneaded mixture was washed with water, and further mixed with 9.0 g of pigment derivative 2-1 and 1000 g of water. The resulting mixture was dispersed in a sand grinder containing zirconia beads with a diameter of 0.5 mm in an amount by volume of 50%. Thus, Pigment dispersion liquid 2-24 was obtained.

Preparation of Pigment Dispersion Liquids 2-25 and 2-26

Pigment dispersion liquids 2-25 and 2-26 were prepared in the same manner as in Pigment dispersion liquid 2-24, except that kinds of pigment or pigment derivative were changed as shown in Table 2-1.

TABLE 2-1

| Pigment dispersion liquid No. | Preparation procedure | Kinds of pigment | Surfactant | Solvent of Solution A | Pigment derivative used | Desalting | Remarks |
|---|---|---|---|---|---|---|---|
| 2-1 | A' | Pigment Red 122 | — | DMSO | 2-1 | *S | Comp. |
| 2-2 | A' | Pigment Red 122 | SA-1 | DMSO | — | S | Inv. |
| 2-3 | A' | Pigment Red 122 | SA-1 | DMSO | 2-1 | S | Inv. |
| 2-4 | A' | Pigment Red 122 | SA-1 | DMSO | 2-1 | **P | Inv. |
| 2-5 | A' | Pigment Red 122 | SA-2 | DMSO | 2-1 | S | Inv. |
| 2-6 | A' | Pigment Red 122 | SA-3 | DMSO | 2-1 | S | Inv. |
| 2-7 | A' | Pigment Red 122 | SA-4 | DMSO | 2-1 | S | Inv. |
| 2-8 | A' | Pigment Blue 15:3 | SA-1 | ***Py | 2 | S | Inv. |
| 2-9 | A' | Pigment Yellow 128 | SA-1 | DMF | 3 | S | Inv. |
| 2-10 | B' | Pigment Red 122 | — | DMSO | 2-1 | S | Comp. |
| 2-11 | B' | Pigment Red 122 | SA-1 | DMSO | — | S | Inv. |
| 2-12 | B' | Pigment Red 122 | SA-1 | DMSO | 2-1 | S | Inv. |
| 2-13 | B' | Pigment Red 122 | SA-1 | DMSO | 2-1 | P | Inv. |
| 2-14 | B' | Pigment Red 122 | SA-2 | DMSO | 2-1 | S | Inv. |
| 2-15 | B' | Pigment Red 122 | SA-3 | DMSO | 2-1 | S | Inv. |
| 2-16 | B' | Pigment Red 122 | SA-4 | DMSO | 2-1 | S | Inv. |
| 2-17 | B' | Pigment Red 122 | SA-5 | DMSO | 2-1 | S | Inv. |
| 2-18 | B' | Pigment Red 122 | SA-6 | DMSO | 2-1 | S | Inv. |
| 2-19 | B' | Pigment Blue 15:3 | SA-1 | Py | 2 | S | Inv. |
| 2-20 | B' | Pigment Blue 15:3 | SA-3 | Py | 2 | S | Inv. |
| 2-21 | B' | Pigment Yellow 128 | SA-1 | DMF | 3 | S | Inv. |
| 2-22 | B' | Pigment Yellow 128 | SA-3 | DMF | 3 | S | Inv. |
| 2-23 | B' | Pigment Red 122 | SA-7 | DMSO | 2-1 | S | Comp. |
| 2-24 | C' | Pigment Red 122 | SA-1 | — | 2-1 | S | Comp. |

TABLE 2-1-continued

| Pigment dispersion liquid No. | Preparation procedure | Kinds of pigment | Surfactant | Solvent of Solution A | Pigment derivative used | Desalting | Remarks |
|---|---|---|---|---|---|---|---|
| 2-25 | C' | Pigment Blue 15:3 | SA-1 | — | 2 | S | Comp. |
| 2-26 | C' | Pigment Yellow 128 | SA-1 | — | 3 | S | Comp. |

*"S" means that precipitation and desalting are simultaneously carried out.
***"P" means that precipitation is carried out, and then desalting are carried out.
****"Py" means pyridine.

Evaluation of Pigment Dispersion Liquid
(Conformation of Adsorption of the Surfactants on the Pigment Surface)

Sodium chloride was added to each of the above obtained pigment dispersion liquids to give a sodium chloride concentration of 0.1% by weight, whereby pigment was precipitated. The precipitated pigment was separated by centrifuge, washed with a 0.1% by weight sodium chloride solution, washed with water and dried. Diffusion reflection infrared absorption spectra of the resulting pigment were measured. Pigment having an absorption peak of the surfactant in the spectra was represented by "A", and pigment having no absorption peak of the surfactant in the spectra was represented by "B".

(Measurement of a Primary Particle Size of Pigment Particles)

The average primary particle size of the pigment particles in the pigment dispersion liquid was computed in the same manner as in Example 1-1.

(Determination of $D_{90}$, $D_{50}$ and $D_{10}$ and PDI)

$D_{90}$, $D_{50}$ and $D_{10}$, and PDI were obtained in the same manner as in Example 1-1.

The results are shown in Table 2-2.

TABLE 2-2

| Pigment dispersion liquid No. | Surfactant | Average primary particle size (nm) | $D_{10}$ | $D_{90}$ | $D_{90}$–$D_{10}$ | PDI | Remarks |
|---|---|---|---|---|---|---|---|
| 2-1 | A | 22 | 4 | 50 | 46 | 2.09 | Comp. |
| 2-2 | A | 16 | 7 | 25 | 18 | 1.13 | Inv. |
| 2-3 | A | 11 | 5 | 20 | 15 | 1.36 | Inv. |
| 2-4 | A | 11 | 5 | 20 | 15 | 1.36 | Inv. |
| 2-5 | A | 10 | 5 | 14 | 9 | 0.90 | Inv. |
| 2-6 | A | 16 | 5 | 22 | 17 | 1.06 | Inv. |
| 2-7 | A | 11 | 4 | 16 | 12 | 1.09 | Inv. |
| 2-8 | A | 14 | 6 | 23 | 17 | 1.21 | Inv. |
| 2-9 | A | 13 | 6 | 22 | 16 | 1.23 | Inv. |
| 2-10 | A | 23 | 4 | 57 | 53 | 2.30 | Comp. |
| 2-11 | A | 20 | 6 | 30 | 24 | 1.20 | Inv. |
| 2-12 | A | 14 | 5 | 22 | 17 | 1.21 | Inv. |
| 2-13 | A | 15 | 6 | 25 | 19 | 1.27 | Inv. |
| 2-14 | A | 11 | 4 | 16 | 12 | 1.09 | Inv. |
| 2-15 | A | 18 | 6 | 30 | 24 | 1.33 | Inv. |
| 2-16 | A | 11 | 4 | 16 | 12 | 1.09 | Inv. |
| 2-17 | A | 11 | 6 | 21 | 15 | 1.36 | Inv. |
| 2-18 | A | 12 | 6 | 20 | 14 | 1.17 | Inv. |
| 2-19 | A | 16 | 6 | 24 | 18 | 1.13 | Inv. |
| 2-20 | A | 17 | 7 | 21 | 14 | 0.82 | Inv. |
| 2-21 | A | 13 | 4 | 23 | 19 | 1.46 | Inv. |
| 2-22 | A | 17 | 6 | 28 | 22 | 1.29 | Inv. |
| 2-23 | B | 48 | 7 | 130 | 123 | 2.56 | Comp. |
| 2-24 | A | 35 | 8 | 83 | 75 | 2.14 | Comp. |
| 2-25 | A | 37 | 7 | 95 | 88 | 2.38 | Comp. |
| 2-26 | A | 43 | 10 | 105 | 95 | 2.21 | Comp. |

Inv.: Invention, Comp. Comparative

As is apparent from Table 2-2 above, the inventive pigment dispersion liquids according to the invention provided a small primary particle size and an extremely narrow particle size distribution, as compared with comparative pigment dispersion liquids.

Example 2-2
Preparation of Pigment Inks 2-1 to 2-26

Pigment inks 2-1 through 2-26 were prepared from pigment dispersion liquids 2-1 to 2-26, respectively, as follows:

| | |
|---|---|
| Pigment dispersion liquids 2-1 to 2-26 | 160 g |
| Diethylene glycol | 180 g |
| Glycerin | 80 g |
| PELEX OT-P (produced by Kao Corp.) | 5 g |
| PROXEL GXL (produced by Zeneca Limited) | 2 g |

Deionized water was added to the above composition to make 1,000 g, and the resulting pigment ink was filtered two times through a Millipore filter of a 1 μm pore diameter. Thus, pigment inks 2-1 through 2-26 were prepared.

(Image Recording on Recording Sheet)

Using an on-demand type ink jet printer with a maximum recording density of 720×720 dpi, installed with a piezo-electric type print-head having a nozzle orifice diameter of 20 μm, a driving frequency of 12 kHz, a nozzle number of 128 per one color and a nozzle density among the same colors of 180 dpi, uniform image patterns 2-1 through 2-26 giving a reflection density of 1.0 were recorded on a plain paper sheet and a porous paper sheet having voids with an average void size of 0.03 μm. The term, "dpi" herein referred to represents a dot number per 2.54 cm.

Evaluation of Pigment Ink and Output Image
(Evaluation of Dispersion Stability)

The particle size of the particles of each pigment ink was measured employing Zetasizer 1000 (produced by Malvern Instruments Co., Ltd.). Subsequently, 100 ml of the pigment ink was placed in a tightly closed vessel so that evaporation of the ink solvent did not occur, allowed to stand at 60° C. in a thermostat for one week, and the particle size of the particles of the resulting pigment ink was again measured employing Zetasizer 1000. Then, the variation rate of the particle size of the particles in the resulting ink was determined. Evaluation of dispersion stability was carried out according to the following criteria:

A: The variation rate of the particle size was less than 10%.
B: The variation rate of the particle size was in the range of 10 to 50%.
C: The variation rate of the particle size was more than 50%.

(Evaluation of Ink Recording Head Nozzle Clogging)

Employing a piezo type ink recording head having nozzles with a nozzle diameter of 20 µ, pigment ink was continuously jetted in an amount of 12 pl per one droplet for one week without cleaning of the nozzles, and then the nozzles were observed. Evaluation of the ink recording head nozzle clogging was carried out according to the following criteria:

A: Ink was jetted normally from all of the nozzles.
B: One to three nozzles were clogged, but the clogged nozzles were cleaned by suction.
C: Four or more nozzles were clogged, and one or more clogged nozzles could not be cleaned by suction.

(Evaluation of Bronzing)

Bronzing was visually observed according to the following criteria:

A: Bronzing was scarcely observed.
B: Slight bronzing was observed, but was not problematic.
C: Bronzing problematic for practical use was observed.
D: Marked bronzing was observed.

(Evaluation of Glossiness)

Image clarity (Gloss value, C value %) of the image pattern obtained above was measured at a reflection angle of 60° and at an optical wedge with a width of 2 mm, employing an image-clarity measuring machine ICM-LDP (produced by Suga Shiken Kikai Co., Ltd.). Evaluation was carried out according to the following criteria:

A: The C value % was not less than 61.
B: The C value % was in the range of 61 to 50.
C: The C value % was in the range of 50 to 41.
D: The C value % was not more than 40.

In the above evaluation, rankings A and B were judged as being practically preferable.

(Evaluation of Light-fastness)

The image portion having a reflection density of 1.0 in each of the yellow, magenta and cyan wedge images was light exposed at 70,000 lx for 60 days, employing a xenon fadometer. The residual density of the reflection density was determined by the following formula:

Residual density rate (%) of the reflection density=Reflection density after the light exposure×100/Reflection density before the light exposure The light-fastness was evaluated according to the following criteria.

A: Residual density rate was from 85% to less than 95%.
B: Residual density rate was from 70% to less than 85%.
C: Residual density rate was from 50% to less than 70%.
D. Residual density rate was less than 50%.

The results are shown in Table 2-3.

TABLE 2-3

| Image No. | Pigment ink No. | Dispersion stability | Nozzle clogging | Plain paper sheet | | | Porous paper sheet | | | Remarks |
| --- | --- | --- | --- | --- | --- | --- | --- | --- | --- | --- |
| | | | | Bronzing | Glossiness | Light-fastness | Bronzing | Glossiness | Light-fastness | |
| 2-1  | 2-1  | B | B | C | C | 2 | D | C | 2 | Comp. |
| 2-2  | 2-2  | B | B | B | B | 3 | B | B | 3 | Inv. |
| 2-3  | 2-3  | A | A | B | B | 3 | A | A | 5 | Inv. |
| 2-4  | 2-4  | B | B | B | B | 3 | B | B | 4 | Inv. |
| 2-5  | 2-5  | A | A | B | B | 4 | A | A | 5 | Inv. |
| 2-6  | 2-6  | A | A | B | B | 3 | B | B | 4 | Inv. |
| 2-7  | 2-7  | A | A | B | B | 4 | A | A | 5 | Inv. |
| 2-8  | 2-8  | A | A | B | B | 4 | A | A | 5 | Inv. |
| 2-9  | 2-9  | A | A | B | B | 3 | A | A | 4 | Inv. |
| 2-10 | 2-10 | B | B | C | C | 2 | D | C | 2 | Comp. |
| 2-11 | 2-11 | B | B | B | B | 3 | B | B | 3 | Inv. |
| 2-12 | 2-12 | A | A | B | B | 3 | A | A | 5 | Inv. |
| 2-13 | 2-13 | B | B | B | B | 3 | B | B | 4 | Inv. |
| 2-14 | 2-14 | A | A | B | B | 3 | A | A | 5 | Inv. |
| 2-15 | 2-15 | A | A | B | B | 3 | B | B | 4 | Inv. |
| 2-16 | 2-16 | A | A | B | B | 3 | A | A | 5 | Inv. |
| 2-17 | 2-17 | A | A | B | B | 3 | A | A | 5 | Inv. |
| 2-18 | 2-18 | A | A | B | B | 3 | A | A | 5 | Inv. |
| 2-19 | 2-19 | A | A | B | B | 3 | A | A | 5 | Inv. |
| 2-20 | 2-20 | A | A | B | B | 3 | B | B | 4 | Inv. |
| 2-21 | 2-21 | A | A | B | B | 3 | A | A | 4 | Inv. |
| 2-22 | 2-22 | A | A | B | B | 3 | B | B | 4 | Inv. |
| 2-23 | 2-23 | B | B | C | C | 2 | C | C | 2 | Comp. |
| 2-24 | 2-24 | C | C | D | C | 2 | D | D | 2 | Comp. |
| 2-25 | 2-25 | C | C | D | C | 2 | D | D | 2 | Comp. |
| 2-26 | 2-26 | C | C | D | C | 2 | D | D | 2 | Comp. |

As is apparent from Table 2-3 above, inventive pigment inks comprising pigment particles, on the surface of which the surfactants are adsorbed, having the average primary particle size, ($D_{90}$–$D_{10}$), or PDI as specified in the invention, provide good dispersion stability, good resistance to nozzle clogging during ink jetting, images with minimized bronzing and good glossiness, as compared with comparative pigment inks. Particularly when inventive pigment inks were jetted on the porous paper sheet to form an image, the image exhibits especially good results.

In the following examples and comparative examples, the term "%" represents "% by weight", unless otherwise specified.

Example 3-1

2,9-Disodiumsulfoquinacridone of 1.0 g was added to a mixture solution of 200 ml of water and 7.5 g of acetic acid in a 1 liter three neck flask, and dispersed while stirring to obtain a dispersion liquid.

The dispersion liquid was cooled with ice and dropwise added at 0 to 20° C. with a solution, in which 10 g (29 mmol) of C.I. Pigment Red 122 was dissolved in a mixture solution of 150 ml of dimethylsulfoxide and 50 ml of an aqueous 10% sodium hydroxide solution.

After the addition, the resulting dispersion mixture was added with methanol, centrifuged, and the supernatant was removed. The resulting residue was added with 500 ml of water and dispersed in a sand mill for two hours to obtain a 5% C.I. Pigment Red 122 dispersion liquid (Magenta pigment dispersion liquid 3-1).

In order to measure a primary particle size of dispersed particles in this dispersion liquid, the particle length of each of the 1,000 primary particles was measured by means of an electronic microscope, and the average primary particle size thereof was computed. The average primary particle size was 30 nm. Herein, the primary particle size means a particle length of the primary particles.

Comparative Example 3-1

Magenta pigment dispersion liquid 3-2 was prepared in the same manner as in Example 3-1, except that 2,9-disodiumsulfoquinacridone was added in advance to the solution, in which C.I. Pigment Red 122 was dissolved in the mixture solution of dimethylsulfoxide and an aqueous 10% sodium hydroxide solution, instead of being added to the mixture solvent of 200 ml of water and 7.5 g of acetic acid. The average primary particle size of the dispersed particles in this dispersion liquid was 50 nm.

Example 3-2

Magenta pigment dispersion liquid 3-3 was prepared in the same manner as in Example 3-1, except that sulfophenylaminosulfonylquinacridone-dimethylamine salt was used instead of 2,9-disodiumsulfoquinacridone. The average primary particle size of the dispersed particles in this dispersion liquid was 28 nm.

Comparative Example 3-2

Magenta pigment dispersion liquid 3-4 was prepared in the same manner as in Comparative Example 3-1, except that sulfophenylaminosulfonylquinacridone-dimethylamine salt was used instead of 2,9-disodiumsulfoquinacridone. The average primary particle size of the dispersed particles in this dispersion liquid was 45 nm.

Example 3-3

2,9-Disodiumsulfoquinacridone of 1.0 g was added to a mixed solution of 1000 ml of water and 180 g of sodium acetate in a 1 liter three neck flask, and dispersed to obtain a dispersion liquid. The dispersion liquid was cooled with ice and dropwise added at 0 to 20° C. with a solution, in which 10 g of C.I. Pigment Red 122 was dissolved in 100 g of sulfuric acid. After the addition, the resulting dispersion mixture was added with methanol, centrifuged, and the supernatant was removed. The resulting residue was added with 200 ml of water and dispersed in a sand mill for two hours to obtain a 5% C.I. Pigment Red 122 dispersion liquid (Magenta pigment dispersion liquid 3-5). The average primary particle size of the dispersed particles in this dispersion liquid was 43 nm.

Comparative Example 3-3

Magenta pigment dispersion liquid 3-6 was prepared in the same manner as in Example 3-1, except that 2,9-disodiumsulfoquinacridone was added in advance to the solution, in which 10 g of C.I. Pigment Red 122 was dissolved in 100 g of sulfuric acid, instead of being added to the mixed solution of 1000 ml of water and 180 g of sodium acetate. The average primary particle size of the dispersed particles in this dispersion liquid was 66 nm.

Example 3-4

Cyan pigment dispersion liquid 3-1 was prepared in the same manner as in Example 3-3, except that tetrasulfophthalocyanine.tetrasodium salt was used instead of 2,9-disodiumsulfoquinacridone and C.I. Pigment Blue 15:3 was used instead of C.I. Pigment Red 122. The average primary particle size of the dispersed particles in this dispersion liquid was 47 nm.

Comparative Example 3-4

Cyan pigment dispersion liquid 3-2 was prepared in the same manner as in Example 3-4, except that tetrasulfophthalocyanine.tetrasodium salt was added in advance to the solution, in which 10 g of C.I. Pigment Blue 15:3 was dissolved in 100 g of sulfuric acid, instead of being added to the mixed solution of 1000 ml of water and 180 g of sodium acetate. The average primary particle size of the dispersed particles in this dispersion liquid was 58 nm.

Example 3-5

Yellow pigment dispersion liquid 3-1 was prepared in the same manner as in Example 3-3, except that sulfonated C.I. Pigment Yellow 128 was used instead of 2,9-disodiumsulfoquinacridone and C.I. Pigment Yellow 128 was used instead of C.I. Pigment Red 122. The average primary particle size of the dispersed particles in this dispersion liquid was 50 nm.

Comparative Example 3-5

Yellow pigment dispersion liquid 3-2 was prepared in the same manner as in Example 3-5, except that sulfonated C.I. Pigment Yellow 128 was added in advance to the solution, in which 10 g of C.I. Pigment Red 122 was dissolved in 100 g of sulfuric acid, instead of being added to the mixed solution of 1000 ml of water and 180 g of sodium acetate. The average primary particle size of the dispersed particles in this dispersion liquid was 75 nm.

(Preparation of pigment Inks)
Preparation of Magenta Pigment Ink 3-1

| | |
|---|---|
| Magenta pigment dispersion liquid 3-11 | 60 g |
| Diethylene glycol | 180 g |
| Glycerin | 80 g |
| PELEX OT-P (produced by Kao Corp.) | 5 g |
| Proxel GXL (produced by Zeneca Limited) | 2 g |

Deionized water was added to the above composition to make 1,000 g, and the resulting dispersion was filtered two times through a Millipore filter of a 1 μm pore diameter. Thus, Magenta Pigment Ink 3-1 was prepared.

Pigment inks as shown in Table 3-1 were prepared in the same manner as above, except that pigment dispersion liquids as shown in Table 3-1 were used instead of Magenta pigment dispersion liquid 3-1.

The thus obtained pigment inks were evaluated according to the following method.

(Image Recording on Recording Medium)

Using an on-demand type ink jet printer having a maximum recording density of 720×720 dpi, which is installed with a piezoelectric type print-head of a nozzle orifice diameter of 20 μm, a driving frequency of 12 kHz, a nozzle number of 128 per one color and a nozzle density among the same colors of 180 dpi (dpi represents the dot number per 2.54 cm), a uniform image pattern giving a reflection density of 1.0 was recorded on an OHP sheet for ink jet recording.

(Evaluation of Transparency)

The uniform image pattern as obtained above was evaluated by observation of 11 men and 11 women. Numerals "5" to "1" were indicative for ink samples evaluated as being "the best" to "the worst" for the image patterns obtained.

(Evaluation of Dispersion Stability)

The particle size of the particles of each pigment ink was measured employing Zetasizer 1000 (produced by Malvern Instruments Co., Ltd.). Subsequently, 100 ml of the pigment ink was placed in a tightly closed vessel so that evaporation of the ink solvent did not occur, allowed to stand at 60° C. in a thermostat for one week, and the particle size of the particles of the resulting pigment ink was again measured employing Zetasizer 1000. Then, the variation rate of the particle size of the particles in the resulting ink was determined. Evaluation of dispersion stability was carried out according to the following criteria:

A: The variation rate of the particle size was not more than 9%.
B: The variation rate of the particle size was in the range of 10 to 50%.
C: The variation rate of the particle size was not less than 51%.

The test results are shown in Table 3-1.

TABLE 3-1

| Pigment ink | Pigment dispersion | Primary particle size of dispersed particles (nm) | Dispersion stability | Transparency | Remarks |
|---|---|---|---|---|---|
| Magenta pigment ink 3-1 | Magenta pigment dispersion liquid 3-1 | 30 | A | 5 | Inv. |
| Magenta pigment ink 3-2 | Magenta pigment dispersion liquid 3-2 | 50 | B | 3 | Comp. |
| Magenta pigment ink 3-3 | Magenta pigment dispersion liquid 3-3 | 28 | A | 5 | Inv. |
| Magenta pigment ink 3-4 | Magenta pigment dispersion liquid 3-4 | 45 | B | 3 | Comp. |
| Magenta pigment ink 3-5 | Magenta pigment dispersion liquid 3-5 | 43 | A | 4 | Inv. |
| Magenta pigment ink 3-6 | Magenta pigment dispersion liquid 3-6 | 66 | B | 2 | Comp. |
| Cyan pigment ink 3-1 | Cyan pigment dispersion liquid 3-1 | 47 | A | 4 | Inv. |
| Cyan pigment ink 3-2 | Cyan pigment dispersion liquid 3-2 | 58 | B | 2 | Comp. |
| Yellow pigment ink 3-1 | Yellow pigment dispersion liquid 3-1 | 50 | A | 4 | Inv. |
| Yellow pigment ink 3-2 | Yellow pigment dispersion liquid 3-2 | 75 | B | 2 | Comp. |

Inv.: Invention, Comp.: Comparative

As is apparent from Table 3-1 above, the pigment dispersion liquid prepared according to the present invention provided dispersed particles with a small primary particle size, inventive pigment ink prepared from such a pigment dispersion liquid had excellent dispersion stability, and images recorded on a recording sheet employing the inventive pigment ink provided excellent transparency.

EFFECTS OF THE INVENTION

The present invention can provide a pigment dispersion liquid having pigment particles with a small primary particle size and a manufacturing method thereof. Further, the present invention can provide a pigment ink for ink jet recording with improved ink stability, improved glossiness, minimized ink head nozzle clogging, and minimized bronzing, and provide an ink jet recording method employing such pigment ink.

What is claimed is:

1. A pigment dispersion liquid comprising pigment particles and Pigment derivatives, which are derived from the pigment, have the same nucleus as the pigment and polar group, dispersed in a dispersion medium, wherein the pigment derivatives are anionic; wherein the difference ($D_{90}$–$D_{10}$) between $D_{10}$ and $D_{10}$ being not more than 25 rim, and wherein $D_{90}$ and $D_{10}$ represent the primary particle size that the pigment particles having a primary particle size up to and including $D_{90}$ account for 90% by number of the total pigment particles, and the particle size that the pigment particles having a primary particle size up to and including $D_{10}$ account for 10% by number of the total pigment particles, respectively, in the integral of the primary particle size distribution function $dG=f(D) \times dD$ of the pigment particles in which G is a particle number (%) and D is a primary particle size (nm).

2. The pigment dispersion liquid of claim 1, wherein the average primary particle size of the pigment particles is not more than 30 nm.

3. The pigment dispersion liquid of claim 1, further comprising a water soluble polymer.

4. A pigment dispersion liguid comprising:

pigment particles dispersed in a dispersion medium:

pigment derivatives, which are derived from the pigment, having the same nucleus as the pigment and polar group; and a water soluble polymer being adsorbed on the surface of the pigment particles;

wherein the difference $(D_{90}-D_{10})$ between $D_{90}$ and $D_{10}$ being not more than 25 nm, and wherein $D_{90}$ and $D_{10}$ represent the primary particle size that the pigment particles having a primary particle size up to and including $D_{90}$ account for 90% by number of the total pigment particles, and the particle size that the pigment particles having a primary particle size up to and including $D_{10}$ account for 10% by number of the total pigment particles, respectively, in the integral of the primary particle size distribution function $dG=f(D) \times dD$ of the pigment particles in which G is a particle number (%) and D is a primary particle size (nm).

5. The pigment dispersion liquid of claim 4, wherein the water soluble polymer has an anionic group.

6. The pigment dispersion liquid of claim 1, wherein a surfactant is adsorbed on the surface of the pigment particles.

7. The pigment dispersion liquid of claim 1, wherein the dispersion medium is an aqueous medium containing water in an amount of at least 50% by weight.

8. The pigment dispersion dispersion claim 1, wherein the polar group is selected from the group consisting of a sulfonic acid group, a carboxyl group, a phosphate group, a borate group, a hydroxy group, and a group in the form of a salt thereof.

9. A pigment dispersion liquid comprising, pigment particles and pigment derivatives, which are derived from the pigment, having the same nucleus as the pigment and polar group, dispersed in a dispersion medium, wherein the pigment derivative is present in an amount of 0.1 to 50 mol% based on the pigment dispersion, wherein the difference $(D_{90}-D_{10})$ between $D_{90}$ and $D_{10}$ being not more than 25 nm, and wherein $D_{90}$ and $D_{10}$ represent the primary particle size that the pigment particles having a primary particle size up to and including $D_{90}$ account for 90% by number of the total pigment particles, and the particle size that the pigment particles having a primary particle size up to and including $D_{10}$ account for 10% by number of the total pigment particles, respectively, in the integral of the primary particle size distribution function $dG=f(D) \times dD$ of the pigment particles in which G is a particle number (%) and D is a primary particle size (nm).

10. The pigment dispersion liquid of claim 9, wherein the pigment derivatives are anionic.

* * * * *